(12) United States Patent
Nakayama

(10) Patent No.: US 9,285,603 B2
(45) Date of Patent: Mar. 15, 2016

(54) IMAGE BLUR CORRECTION APPARATUS AND IMAGING APPARATUS

(71) Applicant: Sony Corporation, Tokyo (JP)

(72) Inventor: Tatsuyuki Nakayama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 162 days.

(21) Appl. No.: 13/852,044

(22) Filed: Mar. 28, 2013

(65) Prior Publication Data

US 2013/0321918 A1   Dec. 5, 2013

(30) Foreign Application Priority Data

May 29, 2012 (JP) ................................ 2012-122335

(51) Int. Cl.
*G02B 27/64* (2006.01)

(52) U.S. Cl.
CPC ...... *G02B 27/646* (2013.01); *G03B 2205/0023* (2013.01)

(58) Field of Classification Search
CPC ............... G03B 2205/0007; G03B 2205/0015; G03B 2205/0023; G03B 2205/0053; G03B 2205/0061; G03B 2205/0069; G03B 2205/0076; G03B 2205/0084; G02B 27/64; G02B 27/646

USPC .............................. 359/554, 557; 396/55, 421
See application file for complete search history.

(56) References Cited

U.S. PATENT DOCUMENTS

| 2010/0118402 | A1* | 5/2010 | Washisu ....................... 359/557 |
| 2010/0238306 | A1* | 9/2010 | Ke .............................. 348/208.7 |
| 2011/0279899 | A1* | 11/2011 | Motoike et al. ............... 359/557 |
| 2011/0317987 | A1* | 12/2011 | Nakayama ....................... 396/55 |
| 2012/0250156 | A1* | 10/2012 | Asakawa et al. .............. 359/554 |

FOREIGN PATENT DOCUMENTS

JP    07-274056 A   10/1995

* cited by examiner

*Primary Examiner* — Kimberly N Kakalec
(74) *Attorney, Agent, or Firm* — Hazuki International, LLC

(57) ABSTRACT

Provided is an image blur correction apparatus including a lens unit configured to include at least one lens and configured to be turnable in two different directions using, as supporting points, two axes that are orthogonal to an outer housing, a fixed member configured to turnably support the lens unit in the two directions, a first drive motor configured to be mounted on the fixed member and configured to turn the lens unit in one of the two directions, a second drive motor configured to be mounted on the fixed member and configured to turn the lens unit in another of the two directions, and a coupling member configured to be coupled to the first drive motor and the second drive motor and configured to include a coupling portion.

12 Claims, 35 Drawing Sheets

1 · · · IMAGING APPARATUS
2 · · · OUTER HOUSING
20 · · · IMAGE BLUR CORRECTION APPARATUS
21 · · · LENS UNIT

1 · · · IMAGING APPARATUS
2 · · · OUTER HOUSING

20 ··· IMAGE BLUR CORRECTION APPARATUS
21 ··· LENS UNIT
22 ··· FIXED MEMBER
30 ··· COUPLING MEMBER
30b ··· SECOND TOLERANCE PORTION
30c ··· COUPLING PORTION
32 ··· SECOND DRIVE MOTOR
32a ··· MOTOR SHAFT
34 ··· SECOND MOVEMENT MEMBER

20 ··· IMAGE BLUR CORRECTION APPARATUS
21 ··· LENS UNIT
30 ··· COUPLING MEMBER
30a ··· FIRST TOLERANCE PORTION
30b ··· SECOND TOLERANCE PORTION
30c ··· COUPLING PORTION
31 ··· FIRST DRIVE MOTOR
31a ··· MOTOR SHAFT
32 ··· SECOND DRIVE MOTOR
32a ··· MOTOR SHAFT
33 ··· FIRST MOVEMENT MEMBER
34 ··· SECOND MOVEMENT MEMBER
35 ··· BIASING SPRING

20 ··· IMAGE BLUR CORRECTION APPARATUS
21 ··· LENS UNIT
22 ··· FIXED MEMBER

20 ··· IMAGE BLUR CORRECTION APPARATUS
21 ··· LENS UNIT
22 ··· FIXED MEMBER
30 ··· COUPLING MEMBER
30b ··· SECOND TOLERANCE PORTION
30c ··· COUPLING PORTION
32 ··· SECOND DRIVE MOTOR
32a ··· MOTOR SHAFT
34 ··· SECOND MOVEMENT MEMBER

20 ··· IMAGE BLUR CORRECTION APPARATUS
21 ··· LENS UNIT
30 ··· COUPLING MEMBER
30a ··· FIRST TOLERANCE PORTION
30b ··· SECOND TOLERANCE PORTION
30c ··· COUPLING PORTION
31 ··· FIRST DRIVE MOTOR
31a ··· MOTOR SHAFT
32 ··· SECOND DRIVE MOTOR
32a ··· MOTOR SHAFT
33 ··· FIRST MOVEMENT MEMBER
34 ··· SECOND MOVEMENT MEMBER
35 ··· BIASING SPRING

20 · · · IMAGE BLUR CORRECTION APPARATUS
21 · · · LENS UNIT
22 · · · FIXED MEMBER
30 · · · COUPLING MEMBER
30b · · · SECOND TOLERANCE PORTION
30c · · · COUPLING PORTION
32 · · · SECOND DRIVE MOTOR
32a · · · MOTOR SHAFT
34 · · · SECOND MOVEMENT MEMBER

20 ··· IMAGE BLUR CORRECTION APPARATUS
21 ··· LENS UNIT
30 ··· COUPLING MEMBER
30a ··· FIRST TOLERANCE PORTION
30b ··· SECOND TOLERANCE PORTION
30c ··· COUPLING PORTION
31 ··· FIRST DRIVE MOTOR
31a ··· MOTOR SHAFT
32 ··· SECOND DRIVE MOTOR
32a ··· MOTOR SHAFT
33 ··· FIRST MOVEMENT MEMBER
34 ··· SECOND MOVEMENT MEMBER
35 ··· BIASING SPRING

| | |
|---|---|
| 20 · · · IMAGE BLUR CORRECTION APPARATUS | 31 · · · FIRST DRIVE MOTOR |
| | 31a · · · MOTOR SHAFT |
| 21 · · · LENS UNIT | 32 · · · SECOND DRIVE MOTOR |
| 30 · · · COUPLING MEMBER | 32a · · · MOTOR SHAFT |
| 30a · · · FIRST TOLERANCE PORTION | 33 · · · FIRST MOVEMENT MEMBER |
| 30b · · · SECOND TOLERANCE PORTION | 34 · · · SECOND MOVEMENT MEMBER |
| 30c · · · COUPLING PORTION | 35 · · · BIASING SPRING |

20 · · · IMAGE BLUR CORRECTION APPARATUS
21 · · · LENS UNIT
22 · · · FIXED MEMBER
30 · · · COUPLING MEMBER
30b · · · SECOND TOLERANCE PORTION
30c · · · COUPLING PORTION
32 · · · SECOND DRIVE MOTOR
32a · · · MOTOR SHAFT
34 · · · SECOND MOVEMENT MEMBER

20 ··· IMAGE BLUR CORRECTION APPARATUS
21 ··· LENS UNIT
30 ··· COUPLING MEMBER
30a ··· FIRST TOLERANCE PORTION
30b ··· SECOND TOLERANCE PORTION
30c ··· COUPLING PORTION
31 ··· FIRST DRIVE MOTOR
31a ··· MOTOR SHAFT
32 ··· SECOND DRIVE MOTOR
32a ··· MOTOR SHAFT
33 ··· FIRST MOVEMENT MEMBER
34 ··· SECOND MOVEMENT MEMBER
35 ··· BIASING SPRING

20A · · · IMAGE BLUR CORRECTION APPARATUS
21A · · · LENS UNIT
22A · · · FIXED MEMBER
30 · · · COUPLING MEMBER
30c · · · COUPLING PORTION
32 · · · SECOND DRIVE MOTOR
32a · · · MOTOR SHAFT
34 · · · SECOND MOVEMENT MEMBER

20A · · · IMAGE BLUR CORRECTION APPARATUS
21A · · · LENS UNIT
30 · · · COUPLING MEMBER
30b · · · SECOND TOLERANCE PORTION
30c · · · COUPLING PORTION
32 · · · SECOND DRIVE MOTOR
32a · · · MOTOR SHAFT
33 · · · FIRST MOVEMENT MEMBER
34 · · · SECOND MOVEMENT MEMBER

20B · · · IMAGE BLUR CORRECTION APPARATUS
21B · · · LENS UNIT
22B · · · FIXED MEMBER
30 · · · COUPLING MEMBER
30b · · · SECOND TOLERANCE PORTION
30c · · · COUPLING PORTION
31 · · · FIRST DRIVE MOTOR
32 · · · SECOND DRIVE MOTOR
32a · · · MOTOR SHAFT
34 · · · SECOND MOVEMENT MEMBER
35 · · · BIASING SPRING

20B · · · IMAGE BLUR CORRECTION APPARATUS
21B · · · LENS UNIT
22B · · · FIXED MEMBER
30 · · · COUPLING MEMBER
30a · · · FIRST TOLERANCE PORTION
30b · · · SECOND TOLERANCE PORTION
30c · · · COUPLING PORTION
31 · · · FIRST DRIVE MOTOR
31a · · · MOTOR SHAFT
32 · · · SECOND DRIVE MOTOR
32a · · · MOTOR SHAFT
33 · · · FIRST MOVEMENT MEMBER
34 · · · SECOND MOVEMENT MEMBER
35 · · · BIASING SPRING

| | |
|---|---|
| 20C · · · IMAGE BLUR CORRECTION APPARATUS | 31 · · · FIRST DRIVE MOTOR |
| | 31a · · · MOTOR SHAFT |
| 21C · · · LENS UNIT | 32 · · · SECOND DRIVE MOTOR |
| 22C · · · FIXED MEMBER | 32a · · · MOTOR SHAFT |
| 30 · · · COUPLING MEMBER | 33 · · · FIRST MOVEMENT MEMBER |
| 30a · · · FIRST TOLERANCE PORTION | 34 · · · SECOND MOVEMENT MEMBER |
| 30b · · · SECOND TOLERANCE PORTION | 35 · · · BIASING SPRING |
| 30c · · · COUPLING PORTION | |

20C · · · IMAGE BLUR CORRECTION APPARATUS
21C · · · LENS UNIT
22C · · · FIXED MEMBER
30 · · · COUPLING MEMBER
30b · · · SECOND TOLERANCE PORTION

30c · · · COUPLING PORTION
32 · · · SECOND DRIVE MOTOR
32a · · · MOTOR SHAFT
34 · · · SECOND MOVEMENT MEMBER

| | |
|---|---|
| 20C ··· IMAGE BLUR CORRECTION APPARATUS | 31 ··· FIRST DRIVE MOTOR |
| 21C ··· LENS UNIT | 31a ··· MOTOR SHAFT |
| 22C ··· FIXED MEMBER | 32 ··· SECOND DRIVE MOTOR |
| 30 ··· COUPLING MEMBER | 32a ··· MOTOR SHAFT |
| 30a ··· FIRST TOLERANCE PORTION | 33 ··· FIRST MOVEMENT MEMBER |
| 30b ··· SECOND TOLERANCE PORTION | 34 ··· SECOND MOVEMENT MEMBER |
| 30c ··· COUPLING PORTION | 35 ··· BIASING SPRING |

20C · · · IMAGE BLUR CORRECTION APPARATUS
21C · · · LENS UNIT
22C · · · FIXED MEMBER
30 · · · COUPLING MEMBER
30b · · · SECOND TOLERANCE PORTION
30c · · · COUPLING PORTION
32 · · · SECOND DRIVE MOTOR
32a · · · MOTOR SHAFT
34 · · · SECOND MOVEMENT MEMBER

| | |
|---|---|
| 20C · · · IMAGE BLUR CORRECTION APPARATUS | 31 · · · FIRST DRIVE MOTOR |
| | 31a · · · MOTOR SHAFT |
| 21C · · · LENS UNIT | 32 · · · SECOND DRIVE MOTOR |
| 22C · · · FIXED MEMBER | 32a · · · MOTOR SHAFT |
| 30 · · · COUPLING MEMBER | 33 · · · FIRST MOVEMENT MEMBER |
| 30a · · · FIRST TOLERANCE PORTION | 34 · · · SECOND MOVEMENT MEMBER |
| 30b · · · SECOND TOLERANCE PORTION | 35 · · · BIASING SPRING |
| 30c · · · COUPLING PORTION | |

20C ··· IMAGE BLUR CORRECTION APPARATUS
21C ··· LENS UNIT
22C ··· FIXED MEMBER
30 ··· COUPLING MEMBER
30b ··· SECOND TOLERANCE PORTION

30c ··· COUPLING PORTION
32 ··· SECOND DRIVE MOTOR
32a ··· MOTOR SHAFT
34 ··· SECOND MOVEMENT MEMBER

20C ··· IMAGE BLUR CORRECTION APPARATUS
21C ··· LENS UNIT
22C ··· FIXED MEMBER
30 ··· COUPLING MEMBER
30a ··· FIRST TOLERANCE PORTION
30b ··· SECOND TOLERANCE PORTION
30c ··· COUPLING PORTION

31 ··· FIRST DRIVE MOTOR
31a ··· MOTOR SHAFT
32 ··· SECOND DRIVE MOTOR
32a ··· MOTOR SHAFT
33 ··· FIRST MOVEMENT MEMBER
34 ··· SECOND MOVEMENT MEMBER
35 ··· BIASING SPRING

20C ··· IMAGE BLUR CORRECTION APPARATUS
21C ··· LENS UNIT
22C ··· FIXED MEMBER
30 ··· COUPLING MEMBER
30b ··· SECOND TOLERANCE PORTION
30c ··· COUPLING PORTION
32 ··· SECOND DRIVE MOTOR
32a ··· MOTOR SHAFT
34 ··· SECOND MOVEMENT MEMBER

20D · · · IMAGE BLUR CORRECTION APPARATUS
21D · · · LENS UNIT
30D · · · COUPLING MEMBER
31 · · · FIRST DRIVE MOTOR
31a · · · MOTOR SHAFT

32 · · · SECOND DRIVE MOTOR
32a · · · MOTOR SHAFT
33D · · · FIRST MOVEMENT MEMBER
34D · · · SECOND MOVEMENT MEMBER
38 · · · BIASING SPRING

| | |
|---|---|
| 20D · · · IMAGE BLUR CORRECTION APPARATUS | 31 · · · FIRST DRIVE MOTOR |
| 21D · · · LENS UNIT | 31a · · · MOTOR SHAFT |
| 22D · · · FIXED MEMBER | 32 · · · SECOND DRIVE MOTOR |
| 30D · · · COUPLING MEMBER | 32a · · · MOTOR SHAFT |
| 30a · · · FIRST TOLERANCE PORTION | 33D · · · FIRST MOVEMENT MEMBER |
| 30b · · · SECOND TOLERANCE PORTION | 34D · · · SECOND MOVEMENT MEMBER |
| 30c · · · COUPLING PORTION | 36a · · · FIRST TOLERANCE PORTION |

20D ··· IMAGE BLUR CORRECTION APPARATUS
21D ··· LENS UNIT
30D ··· COUPLING MEMBER
31 ··· FIRST DRIVE MOTOR
31a ··· MOTOR SHAFT
32 ··· SECOND DRIVE MOTOR
32a ··· MOTOR SHAFT
33D ··· FIRST MOVEMENT MEMBER
34D ··· SECOND MOVEMENT MEMBER
38 ··· BIASING SPRING

20D · · · IMAGE BLUR CORRECTION APPARATUS
21D · · · LENS UNIT
22D · · · FIXED MEMBER
30D · · · COUPLING MEMBER
30a · · · FIRST TOLERANCE PORTION
30b · · · SECOND TOLERANCE PORTION
30c · · · COUPLING PORTION

31 · · · FIRST DRIVE MOTOR
31a · · · MOTOR SHAFT
32 · · · SECOND DRIVE MOTOR
32a · · · MOTOR SHAFT
33D · · · FIRST MOVEMENT MEMBER
34D · · · SECOND MOVEMENT MEMBER
36a · · · FIRST TOLERANCE PORTION

20D ··· IMAGE BLUR CORRECTION APPARATUS
21D ··· LENS UNIT
30D ··· COUPLING MEMBER
31 ··· FIRST DRIVE MOTOR
31a ··· MOTOR SHAFT
32 ··· SECOND DRIVE MOTOR
32a ··· MOTOR SHAFT
33D ··· FIRST MOVEMENT MEMBER
34D ··· SECOND MOVEMENT MEMBER
38 ··· BIASING SPRING

20D · · · IMAGE BLUR CORRECTION APPARATUS
21D · · · LENS UNIT
22D · · · FIXED MEMBER
30D · · · COUPLING MEMBER
30a · · · FIRST TOLERANCE PORTION
30b · · · SECOND TOLERANCE PORTION
30c · · · COUPLING PORTION

31 · · · FIRST DRIVE MOTOR
31a · · · MOTOR SHAFT
32 · · · SECOND DRIVE MOTOR
32a · · · MOTOR SHAFT
33D · · · FIRST MOVEMENT MEMBER
34D · · · SECOND MOVEMENT MEMBER
36a · · · FIRST TOLERANCE PORTION

20D · · · IMAGE BLUR CORRECTION APPARATUS
21D · · · LENS UNIT
30D · · · COUPLING MEMBER
31 · · · FIRST DRIVE MOTOR
31a · · · MOTOR SHAFT
32 · · · SECOND DRIVE MOTOR
32a · · · MOTOR SHAFT
33D · · · FIRST MOVEMENT MEMBER
34D · · · SECOND MOVEMENT MEMBER
38 · · · BIASING SPRING

IMAGE BLUR CORRECTION APPARATUS AND IMAGING APPARATUS

BACKGROUND

The present technology relates to a technical field regarding image blur correction apparatuses and imaging apparatuses. More specifically, the present technology relates to a technical field for making a blur correction operation smoother while also ensuring a degree of design freedom by providing a first drive motor, a second drive motor, and a coupling member by which these two drive motors are coupled, and forming a tolerance portion on the coupling member that allows a lens unit to turn.

In an imaging apparatus such as a video camera and a still camera, an image blur correction apparatus may be provided for correcting image blur by moving a lens in a direction orthogonal to the light axis direction.

The image blur correction apparatus provided in such an imaging apparatus may be configured so that a lens unit, which has a lens, turns in a first direction which is a direction about a first axis with respect to an outer housing, and in a second direction which is a direction about a second axis that is orthogonal to the first axis (e.g., refer to JP H7-274056A).

Image blur correction is performed by, for example, the lens unit being turned in a yaw direction about the first axis, and in a pitch direction about the second axis.

In the image blur correction apparatus described in JP H7-274056A, two gimbal mechanisms, each having a base plate curved in an L shape, are provided to turn the lens unit in the yaw direction and the pitch direction.

The image blur operation is carried out in the pitch direction by turning the lens unit in the pitch direction with respect to one of the gimbal mechanisms, and in the yaw direction by turning the lens unit together with the first gimbal mechanism in the yaw direction with respect to the other gimbal mechanism.

SUMMARY

However, in the image blur correction apparatus described in JP H7-274056A, the two motors used as drive motors for turning the lens unit are each attached to a base plate, and a part of each base plate overlaps the other motor on the outer periphery side of the lens unit.

Therefore, each of the parts unfortunately has to be arranged on the outer periphery side of the lens unit, which means that the degree of design freedom regarding arrangement is low.

On the other hand, in an image blur correction apparatus, since it is necessary to appropriately correct the slight blurring that continuously is produced when capturing images by controlling operation of the lens unit at high speed, there is a need to carry out the operation smoothly.

Accordingly, there is a need for an image blur correction apparatus and an imaging apparatus to make a blur correction operation smoother while also ensuring a degree of design freedom.

According to a first embodiment of the present disclosure, it is preferable that there is provided an image blur correction apparatus including a lens unit configured to include at least one lens and configured to be turnable in two different directions using, as supporting points, two axes that are orthogonal to an outer housing, a fixed member configured to turnably support the lens unit in the two directions, a first drive motor configured to be mounted on the fixed member and configured to turn the lens unit in one of the two directions, a second drive motor configured to be mounted on the fixed member and configured to turn the lens unit in another of the two directions, and a coupling member configured to be coupled to the first drive motor and the second drive motor and configured to include a coupling portion, the coupling portion being coupled to the lens unit to transmit drive force of the first drive motor and the second drive motor to the lens unit in a manner that the coupling member is moved along with turning of the lens unit. The coupling member has, formed thereon, a first tolerance portion configured to maintain a coupled state of the first drive motor while the second drive motor is driven to allow the lens unit to turn in the other direction, and a second tolerance portion configured to maintain a coupled state of the second drive motor while the first drive motor is driven to allow the lens unit to turn in the one direction.

Therefore, in the image blur correction apparatus, the lens unit is turned in a first direction by the first drive motor while the coupled state of the second drive motor is maintained, and the lens unit is turned in a second direction by the second drive motor while the coupled state of the first drive motor is maintained.

According to a second embodiment of the present disclosure, as for the image blur correction apparatus, it is preferable that the coupling portion of the coupling member may be coupled to the lens unit on a first axis or a second axis.

By coupling the coupling portion of the coupling member to the lens unit in the first axis or the second axis, turning of the lens unit is constant based on the movement amount of the coupling member regardless of the turning direction.

According to a third embodiment of the present disclosure, it is preferable that the image blur correction apparatus may further include a biasing spring configured to bias the coupling member in a direction between an axis direction of a first axis and an axis direction of a second axis.

By providing a biasing spring that biases the coupling member in a direction between the axis direction of the first axis and the axis direction of the second axis, the coupling member is moved without any rattling, and the lens unit is turned with a high degree of precision regardless of the turning direction.

According to a fourth embodiment of the present disclosure, it is preferable that the image blur correction apparatus may further include a first movement member configured to be moved by the first drive motor in an axis direction of a second axis, and a second movement member configured to be moved by the second drive motor in an axis direction of a first axis. The coupling member may be moved in the axis direction of the second axis by movement of the first movement member, and is moved in the axis direction of the first axis by movement of the second movement member. The first tolerance portion may be slidably supported by the first movement member in the axis direction of the first axis. The second tolerance portion may be slidably supported by the second movement member in the axis direction of the second axis.

By moving the coupling member in the axis direction of the second axis based on the movement of the first movement member in the first drive motor and in the axis direction of the first axis based on the movement of the second movement member, and slidably supporting a first tolerance portion on the first movement member in the axis direction of the first axis and slidably supporting a second tolerance portion supported on the second movement member in the axis direction of the second axis, tolerance portions are made to slide along the movement members that are moving with the coupling member.

According to a fifth embodiment of the present disclosure, as for the image blur correction apparatus, it is preferable that stepping motors may be used for the first drive motor and the second drive motor. Nut members screwed on motor shafts may be used for the first movement member and the second movement member.

By using stepping motors for the first drive motor and the second drive motor, and nut members screwed on the motor shafts for the first movement member and the second movement member, the nut members are moved by turning of the drive motors.

According to a sixth embodiment of the present disclosure, as for the image blur correction apparatus, it is preferable that the first tolerance portion may be slidably supported by a first movement member. The second tolerance portion may be slidably supported on the second movement member. The first tolerance portion and the second tolerance portion may be formed in an arc shape around an intersection of the two axes.

By slidably supporting the first tolerance portion on the first movement member, slidably supporting the second tolerance portion on the second movement member, and forming the first tolerance portion and the second tolerance portion in an arc shape around an intersection of the two axes, the lens unit is moved in the first direction and the second direction about the intersection.

According to the embodiment of the present disclosure, it is preferable that there is provided an imaging apparatus including an image blur correction apparatus configured to include a lens unit that includes at least one lens and an outer housing that has the lens unit arranged therein. The lens unit is configured to be turnable in two different directions using, as supporting points, two axes that are orthogonal to the outer housing to correct image blur. The image blur correction apparatus includes a fixed member configured to turnably support the lens unit in the two directions, a first drive motor configured to be mounted on the fixed member and configured to turn the lens unit in one of the two directions, a second drive motor configured to be mounted on the fixed member and configured to turn the lens unit in another of the two directions, and a coupling member configured to be coupled to the first drive motor and the second drive motor and configured to include a coupling portion, the coupling portion being coupled to the lens unit to transmit drive force of the first drive motor and the second drive motor to the lens unit in a manner that the coupling member is moved along with turning of the lens unit. The coupling member has, formed thereon, a first tolerance portion configured to maintain a coupled state of the first drive motor while the second drive motor is driven to allow the lens unit to turn in the other direction, and a second tolerance portion configured to maintain a coupled state of the second drive motor while the first drive motor is driven to allow the lens unit to turn in the one direction.

Therefore, for the imaging apparatus, in the image blur correction apparatus, the lens unit is turned in a first direction by the first drive motor while the coupled state of the second drive motor is maintained, and the lens unit is turned in a second direction by the second drive motor while the coupled state of the first drive motor is maintained.

According to the embodiment of the present disclosure, there is provided an image blur correction apparatus including a lens unit configured to include at least one lens and configured to be turnable in two different directions using, as supporting points, two axes that are orthogonal to an outer housing, a fixed member configured to turnably support the lens unit in the two directions, a first drive motor configured to be mounted on the fixed member and configured to turn the lens unit in one of the two directions, a second drive motor configured to be mounted on the fixed member and configured to turn the lens unit in another of the two directions, and a coupling member configured to be coupled to the first drive motor and the second drive motor and configured to include a coupling portion, the coupling portion being coupled to the lens unit to transmit drive force of the first drive motor and the second drive motor to the lens unit in a manner that the coupling member is moved along with turning of the lens unit. The coupling member has, formed thereon, a first tolerance portion configured to maintain a coupled state of the first drive motor while the second drive motor is driven to allow the lens unit to turn in the other direction, and a second tolerance portion configured to maintain a coupled state of the second drive motor while the first drive motor is driven to allow the lens unit to turn in the one direction.

Therefore, there is an increased degree of freedom in the arrangement of coupling member, the first drive motor, and the second drive motor, and the lens unit can be smoothly turned with respect to the fixed member by the first tolerance portion and the second tolerance portion, so that the blur correction operation can be carried out more smoothly while ensuring a degree of design freedom.

According to a second embodiment of the present disclosure, as for the image blur correction apparatus, the coupling portion of the coupling member may be coupled to the lens unit on a first axis or a second axis.

Therefore, turning of the lens unit is constant based on the movement amount of the coupling member regardless of the turning direction, so that the control of the blur correction operation can be performed more easily.

According to a third embodiment of the present disclosure, the image blur correction apparatus may further include a biasing spring configured to bias the coupling member in a direction between an axis direction of a first axis and an axis direction of a second axis.

Therefore, the coupling member is moved without any rattling, and the lens unit is turned with a high degree of precision regardless of the turning direction, so that the positional accuracy of the lens unit in the turning direction can be improved.

According to a fourth embodiment of the present disclosure, the image blur correction apparatus may further include a first movement member configured to be moved by the first drive motor in an axis direction of a second axis, and a second movement member configured to be moved by the second drive motor in an axis direction of a first axis. The coupling member may be moved in the axis direction of the second axis by movement of the first movement member, and is moved in the axis direction of the first axis by movement of the second movement member. The first tolerance portion may be slidably supported by the first movement member in the axis direction of the first axis. The second tolerance portion may be slidably supported by the second movement member in the axis direction of the second axis.

Therefore, since the blur correction operation can be smoothly carried out with a simple configuration, the production costs of the image blur correction apparatus can be reduced and the reliability of the blur correction operation can be improved.

According to a fifth embodiment of the present disclosure, as for the image blur correction apparatus, stepping motors may be used for the first drive motor and the second drive motor. Nut members screwed on motor shafts may be used for the first movement member and the second movement member.

Therefore, since the blur correction operation can be smoothly carried out with a simple configuration, the production costs of the image blur correction apparatus can be reduced and the reliability of the blur correction operation can be improved.

According to a sixth embodiment of the present disclosure, as for the image blur correction apparatus, the first tolerance portion may be slidably supported by a first movement member. The second tolerance portion may be slidably supported on the second movement member. The first tolerance portion and the second tolerance portion may be formed in an arc shape around an intersection of the two axes.

Therefore, the lens unit is moved in the first direction and the second direction about the intersection, so that the blur correction operation can be carried out more smoothly.

According to the embodiment of the present disclosure, there is provided an imaging apparatus including an image blur correction apparatus configured to include a lens unit that includes at least one lens and an outer housing that has the lens unit arranged therein. The lens unit is configured to be turnable in two different directions using, as supporting points, two axes that are orthogonal to the outer housing to correct image blur. The image blur correction apparatus includes a fixed member configured to turnably support the lens unit in the two directions, a first drive motor configured to be mounted on the fixed member and configured to turn the lens unit in one of the two directions, a second drive motor configured to be mounted on the fixed member and configured to turn the lens unit in another of the two directions, and a coupling member configured to be coupled to the first drive motor and the second drive motor and configured to include a coupling portion, the coupling portion being coupled to the lens unit to transmit drive force of the first drive motor and the second drive motor to the lens unit in a manner that the coupling member is moved along with turning of the lens unit. The coupling member has, formed thereon, a first tolerance portion configured to maintain a coupled state of the first drive motor while the second drive motor is driven to allow the lens unit to turn in the other direction, and a second tolerance portion configured to maintain a coupled state of the second drive motor while the first drive motor is driven to allow the lens unit to turn in the one direction.

Therefore, in the image blur correction apparatus, there is an increased degree of freedom in the arrangement of coupling member, the first drive motor, and the second drive motor, and the lens unit can be smoothly turned with respect to the fixed member by the first tolerance portion and the second tolerance portion, so that the blur correction operation can be carried out more smoothly while ensuring a degree of design freedom.

DETAILED DESCRIPTION OF THE EMBODIMENT(S)

Figure 1:
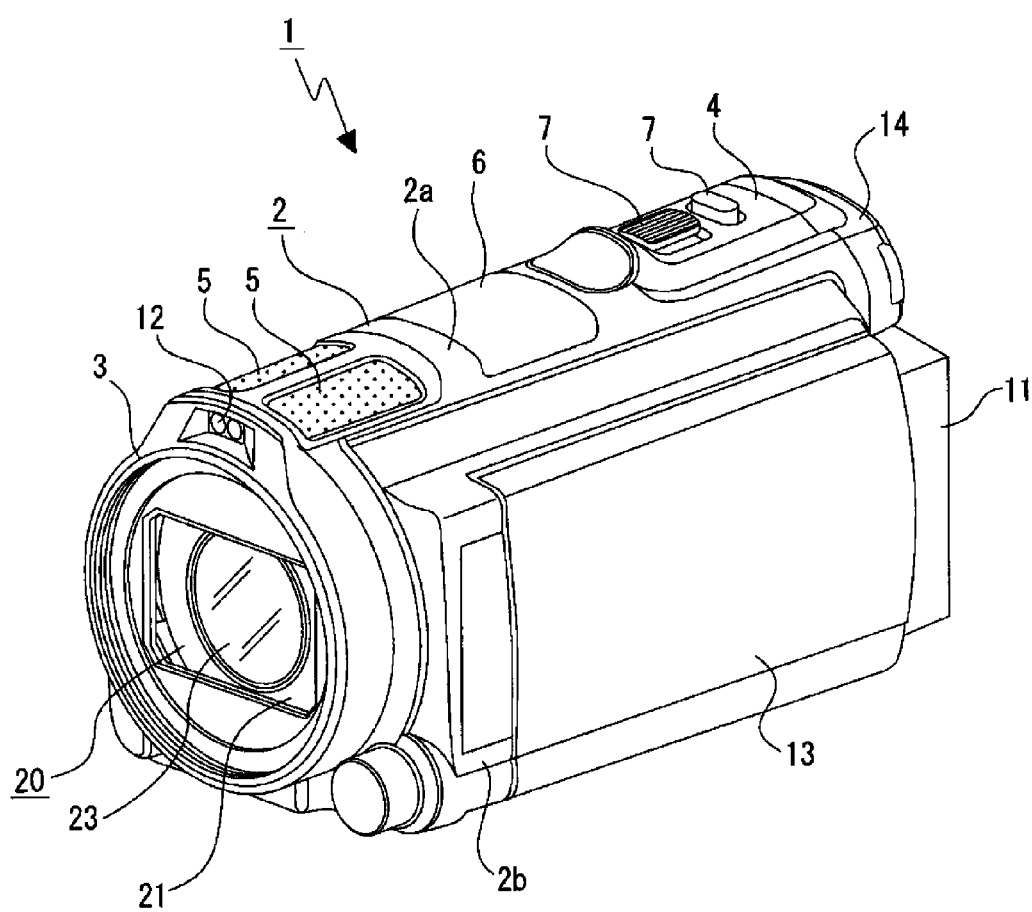
FIG. 1, which along with FIGS. 2 to 35 illustrates an image blur correction apparatus and an imaging apparatus according to an embodiment of the present technology, is a perspective view of an imaging apparatus.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A best mode for implementing out the image blur correction apparatus and imaging apparatus according to an embodiment of the present technology will now be described with reference to the attached drawings.

The below-illustrated best mode applies the imaging apparatus according to an embodiment of the present technology in a video camera, and applies the image blur correction apparatus according to an embodiment of the present technology as an image blur correction apparatus provided in this video camera.

The applicable scope of the imaging apparatus and image blur correction apparatus according to an embodiment of the present technology is not limited, respectively, to a video camera and an image blur correction apparatus provided in a video camera. The imaging apparatus and image blur correction apparatus according to an embodiment of the present technology can be widely applied as an imaging apparatus incorporated in various devices, for example, a still camera, a mobile telephones, a personal computer and the like, or as an image blur correction apparatus provided in such an imaging apparatus.

In the following description, the front/rear, up/down (hereinafter "vertical"), and left/right (hereinafter, "horizontal") directions represent the directions as seen by the photographer when capturing an image with the video camera. Therefore, the object side becomes the front, and the photographer's side becomes the rear.

It is noted that the front/rear, vertical, and horizontal directions mentioned below are to facilitate the description. The present technology is not limited to these directions.

Further, the lens illustrated below can mean either a lens configured from a single lens, or a lens that is configured as a lens group by a plurality of lenses.

[Overall Configuration of the Imaging Apparatus]

Figure 2:
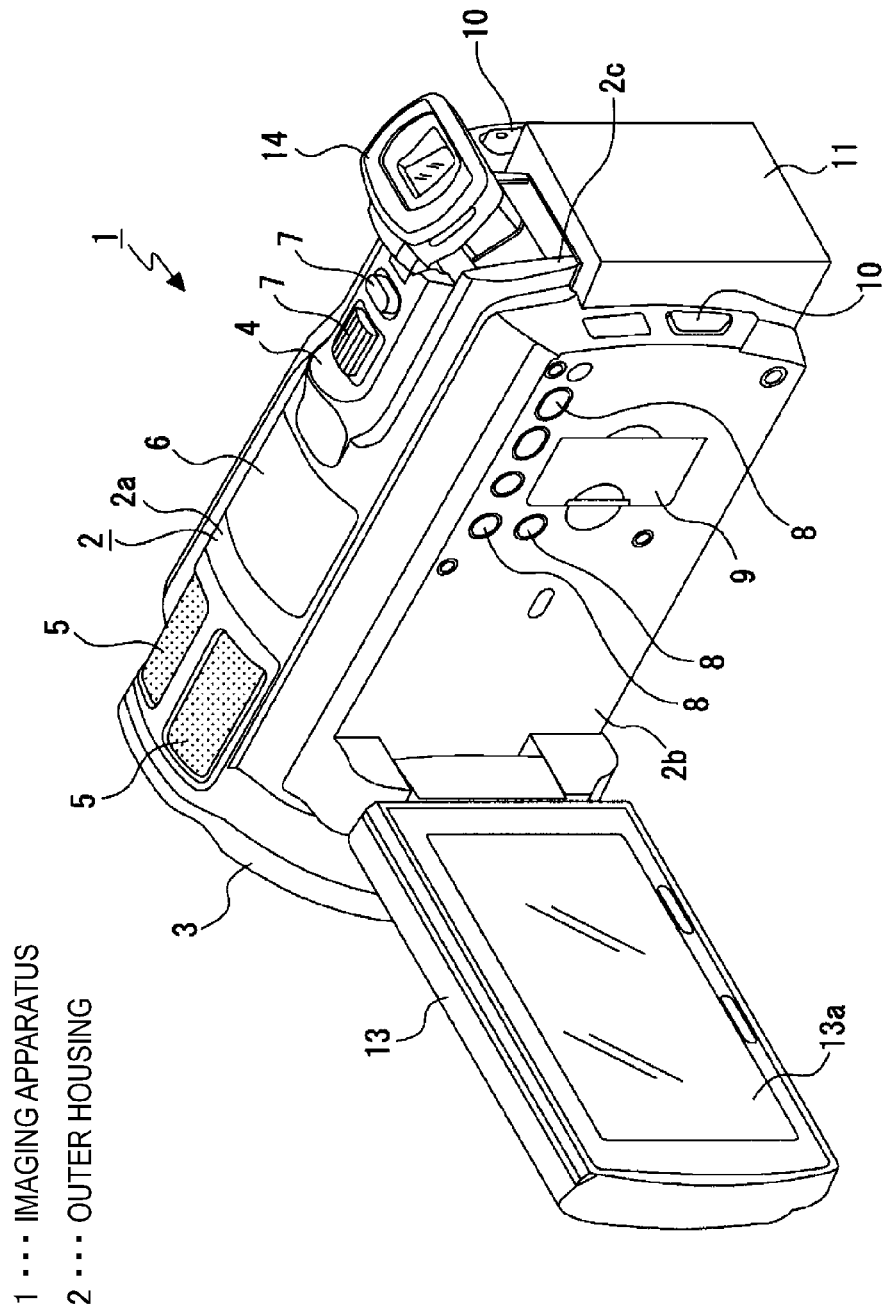
FIG. 2 is a perspective view of an imaging apparatus shown from a different direction to that in FIG. 1.

An imaging apparatus 1 has various parts arranged in and externally to an outer housing 2 (refer to FIGS. 1 and 2). The outer housing 2 is formed in the shape of a casing that is long in the front/rear direction. A front edge portion is provided as a front panel 3, and an upper edge portion at a rear edge portion is provided as a storage case portion 4 that is open to the rear.

Microphones 5 and 5, an interface cover 6, and operating switches 7 and 7 are arranged in order from the front on an upper face 2a of the outer housing 2. The operating switches 7 and 7 are, for example, a zoom lever and imaging buttons.

Various operating buttons 8, 8 . . . , such as a power button and an image playback button, are arranged on one side face 2b of the outer housing 2. A memory card 9 is mounted on one side face 2b of the outer housing 2.

Operating buttons 10 and 10, such as a mode switching button and a recording button, are arranged on a rear face 2c of the outer housing 2.

A battery 11 is mounted on the rear face of the outer housing 2. A part of the battery 11 protrudes towards the rear from the rear face 2c of the outer housing 2.

A flash 12 is arranged on an upper edge portion of the front panel 3. The flash 12, which is used when capturing images at night, irradiates auxiliary light 12 toward the front.

A display unit 13 is turnably and rotatably attached to a side face portion of the outer housing 2. The front edge portion of the display unit 13 is connected to the outer housing 2. The display unit 13 has a display face 13a.

A finder 14 is attached to a rear edge portion of the imaging apparatus 1. The finder 14 can slide in the front/rear direction and can be turned in a tilt direction with respect to the storage case portion 4.

The finder 14 can slide between a storage position, in which the section excluding the rear edge portion is stored in the storage case portion 4, and a pulled-out position, in which the finder 14 has been pulled out from the storage case portion 4. Further, the finder 14 can be turned in a tilt direction about the front edge portion at the pulled-out position.

[Configuration of the Image Blur Correction Apparatus]

An image blur correction apparatus 20 is arranged in the outer housing 2 (refer to FIG. 1). The image blur correction apparatus 20 has a lens unit 21 and a fixed member 22 that supports the lens unit 21 (refer to FIGS. 3 to 5).

The lens unit 21 is formed in, for example, a roughly cylindrical shape that extends in a light axis direction. A plurality of lenses or a lens group arrayed in a light axis direction is provided in the lens unit 21. An imaging lens 23, called a "front lens", is arranged at the front-most side (object side).

A concave coupling portion 21a open to the rear is formed on the rear face of the lens unit 21. The center of the concave coupling portion 21a is in line with the light axis.

A spherically-shaped slide portion 24, which has a diameter greater than the other outer peripheries, is provided on an outer periphery of an intermediate portion in the light axis direction of the lens unit 21. The slide portion 24 is formed in the shape of a sphere around a reference point P, which is a point in the lens unit 21. The reference point P is, for example, positioned on the light axis S.

Each of the spheres 25, 25, . . . is arranged spaced apart in the front/rear direction in a rotatable state on the slide portion 24. The spheres 25, 25, . . . , which are for example arranged spaced apart in the front/rear direction, are provided in pairs spaced apart in the circumferential direction.

The fixed member 22 has a roughly cylindrical support portion 26, and a holding portion 27 that is provided at a rear side of the support portion 26.

A circular portion 28 that has a roughly circular shape is provided at a front edge portion of the support portion 26. An inner periphery of the circular portion 28 is formed as a spherical support face 28a around the above-described reference point P.

The holding portion 27, which is formed in a box shape that is open at the front, is provided at a front edge portion with a batten portion 29 that faces the front/rear direction. An insertion hole 29a is formed on the batten portion 29.

The lens unit 21 is turnably supported on the circular portion 28 of the fixed member 22 via the spheres 25, 25, . . . . When the lens unit 21 is supported on the fixed member 22, the support face 28a of the circular portion 28 is in contact with the spheres 25, 25, . . . , and the lens unit 21 is turned via the spheres 25, 25, . . . .

It is noted that a (not illustrated) falling prevention portion that prevents the spheres 25, 25, . . . from falling out from between the support face 28a and the slide portion 24 is provided on the lens unit 21 or the fixed member 22.

The lens unit 21 can be turned with respect to the fixed member 22 in a first direction (yaw direction) about a first axis that is orthogonal to the light axis and vertically extends through the reference point P, and in a second direction (pitch direction) about a second axis that is orthogonal to the light axis and the first support axis, and horizontally extends through the reference point P.

A coupling member 30 is movably supported in the horizontal direction and the vertical direction on the holding portion 27 of the fixed member 22. The coupling member 30 can move in the horizontal direction and the vertical direction when the coupling member 30 is held from the front/rear direction by a rear face portion of the holding portion 27 and the batten portion 29.

A first tolerance portion 30a that has a groove shape extending vertically and a second tolerance portion 30b that has a groove shape extending horizontally are formed on the coupling member 30. A coupling portion 30c that protrudes toward the front and has a spherically formed tip portion is provided on the coupling member 30.

The coupling portion 30c of the coupling member 30 is inserted through the insertion hole 29a of the batten portion 29 and through the concave coupling portion 21a, thereby being coupled to the lens unit 21 on the light axis. The tip portion of the coupling portion 30c is formed in a spherical shape, so that the coupling portion 30c is relatively rotated when the lens unit 21 is turned.

A first drive motor 31 and a second drive motor 32 are attached inside the holding portion 27 of the fixed member 22. As the first drive motor 31 and the second drive motor 32, a stepping motor may be used, for example.

The first drive motor 31 is arranged to the side of the coupling member 30, and a motor shaft 31a formed with a spiral groove extends in a horizontal direction. A first movement member 33 used by a nut member is screwed on the motor shaft 31a, for example. The first movement member 33 is formed in a prismatic shape, for example. The first tolerance portion 30a of the coupling member 30 is slidably supported in a vertical direction on the first movement member 33. The first movement member 33 does not rotate with respect to the first tolerance portion 30a.

The second drive motor 32 is arranged above or below the coupling member 30, and a motor shaft 32a formed with a spiral groove extends in a vertical direction. A second movement member 34 used by a nut member is screwed on the motor shaft 32a, for example. The second movement member 34 is formed in a prismatic shape, for example. The second tolerance portion 30b of the coupling member 30 is slidably supported in a horizontal direction on the second movement member 34. The second movement member 34 does not rotate with respect to the second tolerance portion 30b.

A biasing spring 35 is supported between the coupling member 30 and the holding portion 27 of the fixed member 22. The coupling member 30 is biased by the biasing spring 35 in a direction between the axis direction of the first axis and the axis direction of the second axis.

[Operation of the Image Blur Correction Apparatus]

The blur correction operation performed in the image blur correction apparatus 20 will now be described.

Figure 3:
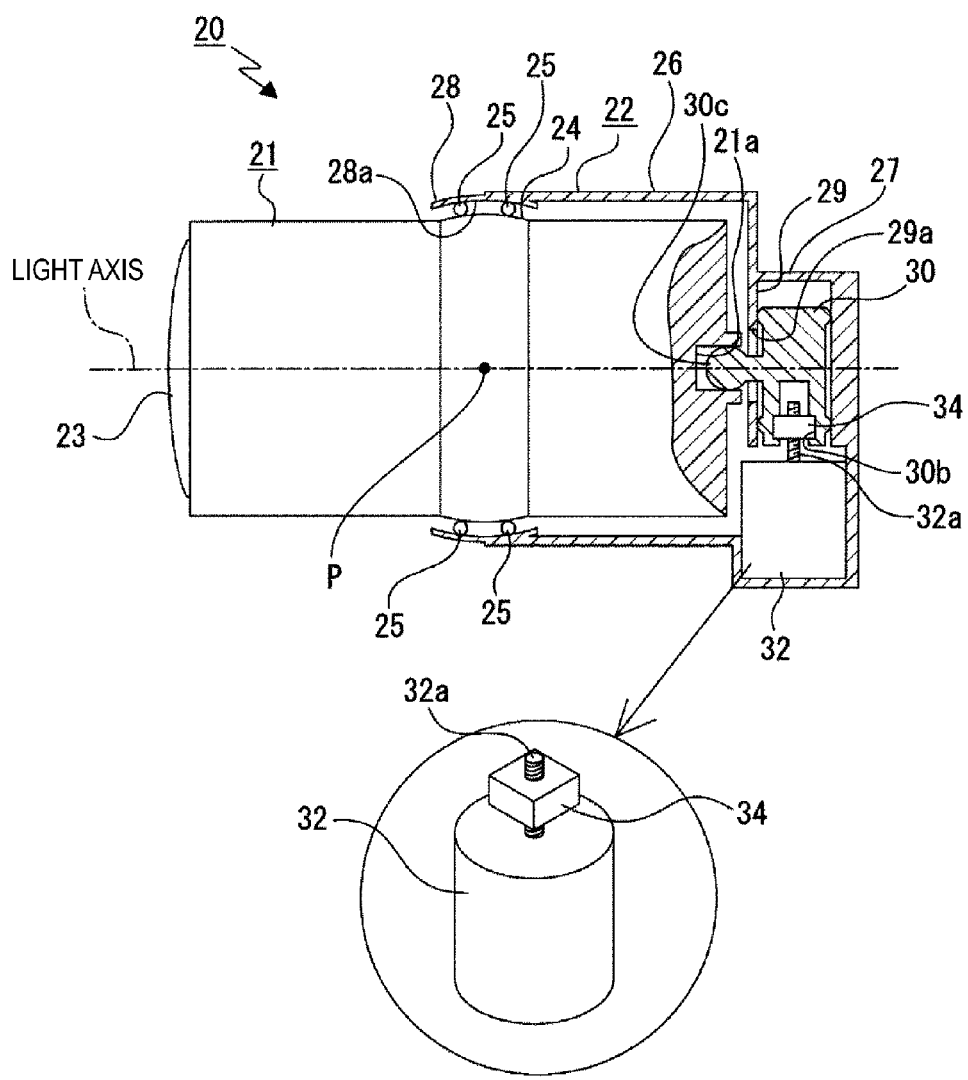
FIG. 3 is a partial cross-sectional side view of an image blur correction apparatus.
Figure 4:
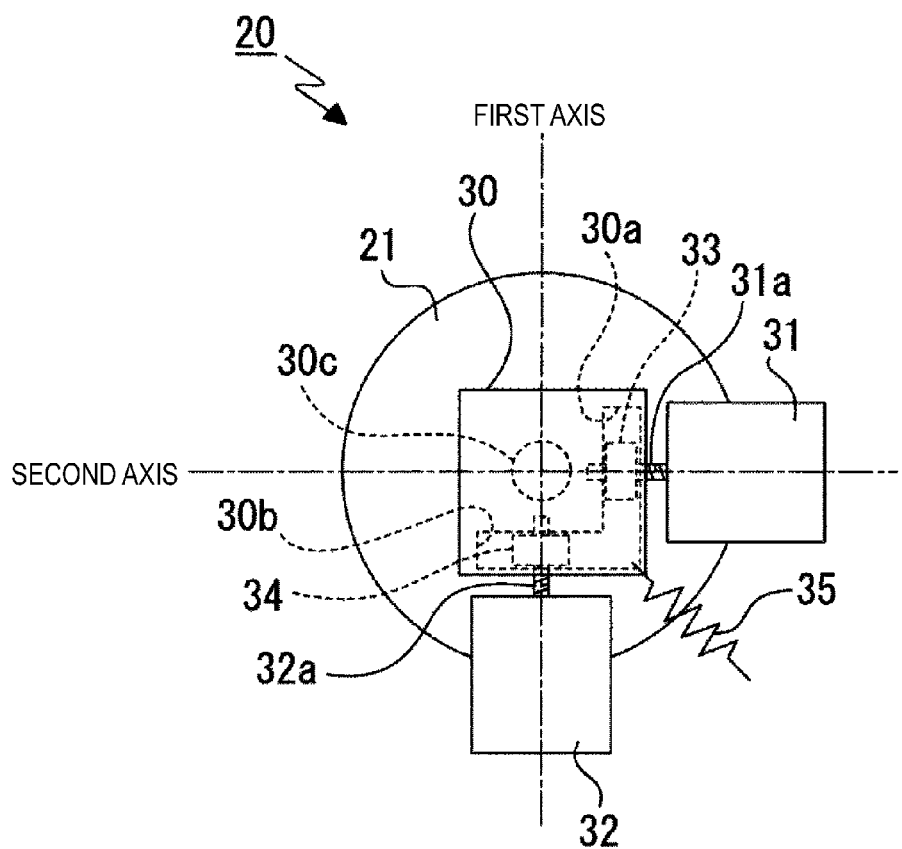
FIG. 4 is a schematic rear view of an image blur correction apparatus.
Figure 5:
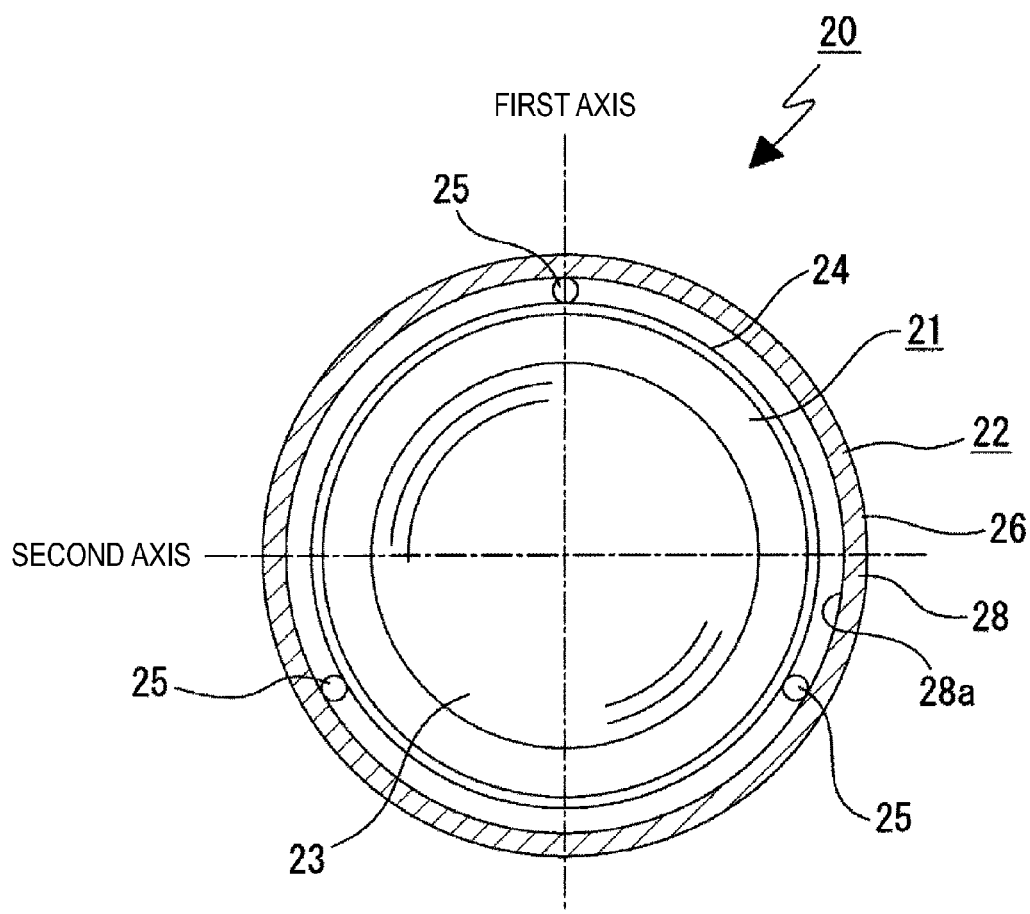
FIG. 5 is a schematic front view of an image blur correction apparatus.

In a state before the blur correction operation is carried out, the image blur correction apparatus 20 is at a reference position where there has been no turning in the first direction or the second direction (refer to FIGS. 3 and 4).

Figure 6:
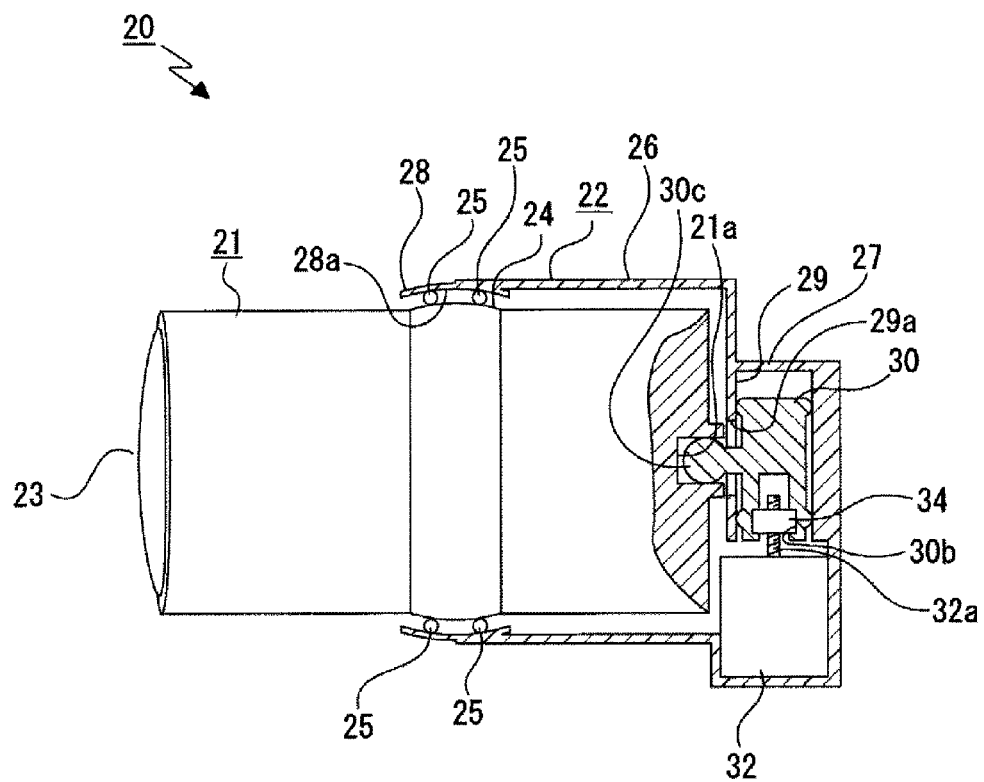
FIG. 6, which along with FIGS. 7 and 11 illustrates operation of an image blur correction apparatus, is a partial cross-sectional side view illustrating a state in which a lens unit has been turned in a first direction.
Figure 7:
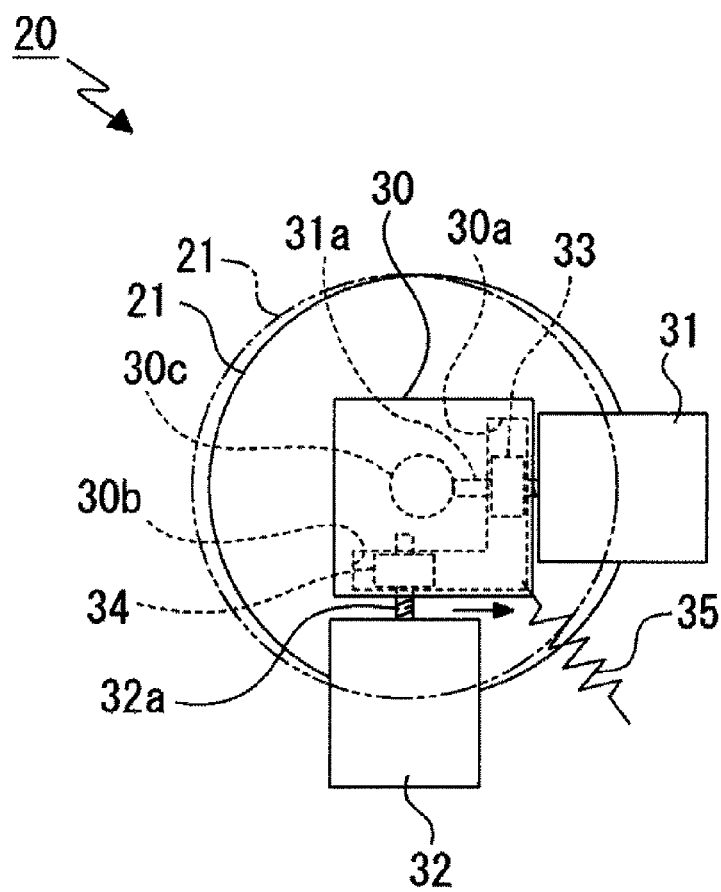
FIG. 7 is a schematic rear view illustrating a state in which a lens unit has been turned in a first direction.

In the image blur correction apparatus 20, when the first drive motor 31 is rotated, the first movement member 33 screwed on the motor shaft 31a is moved in the horizontal direction. In conjunction with the movement of the first movement member 33, the coupling member 30 is moved in the horizontal direction (refer to FIGS. 6 and 7). At this stage, the second tolerance portion 30b of the coupling member 30 slides in the horizontal direction with respect to the second movement member 34 screwed on the motor shaft 32a of the second drive motor 32. When the coupling member 30 is moved in the horizontal direction, the lens unit 21 coupled by the coupling portion 30c is turned in the first direction about the first axis, whereby a correction operation is carried out.

Figure 8:
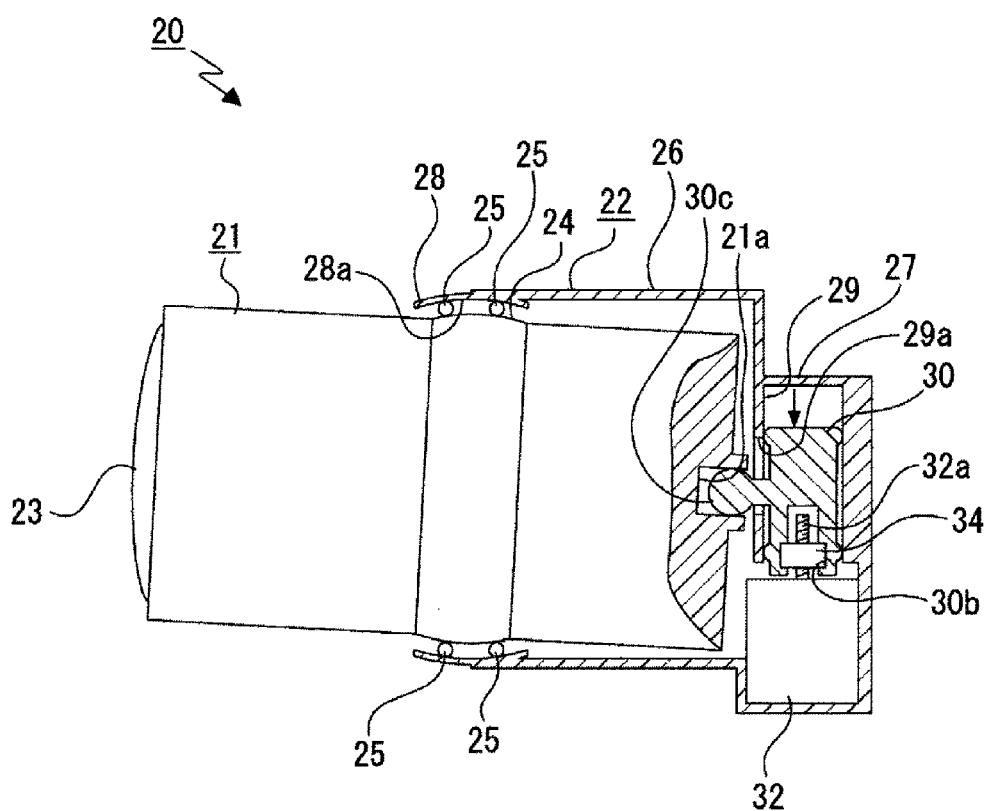
FIG. 8 is a partial cross-sectional side view illustrating a state in which a lens unit has been turned in a second direction.
Figure 9:
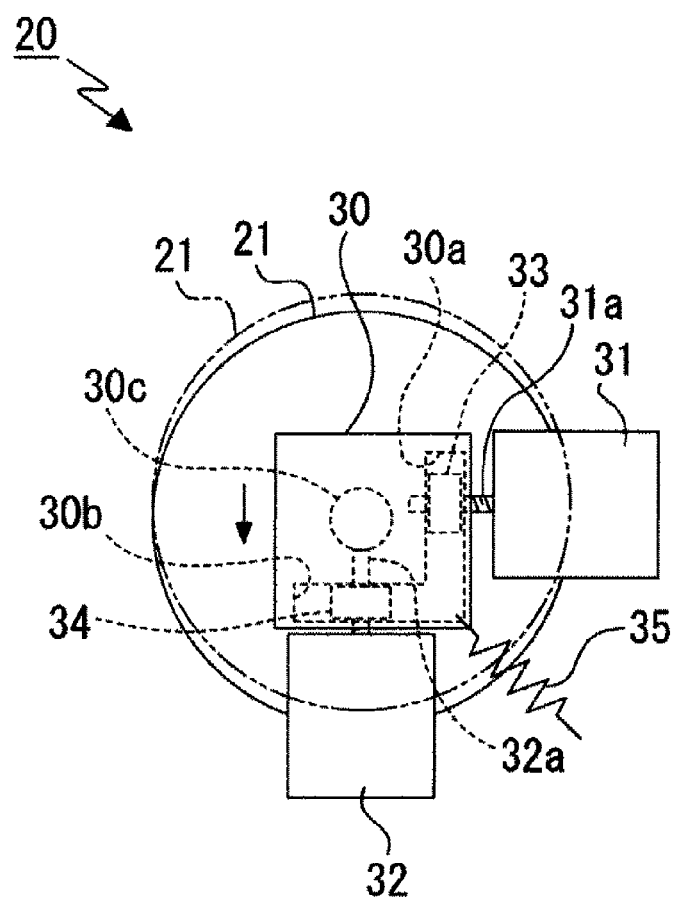
FIG. 9 is a schematic rear view illustrating a state in which a lens unit has been turned in a second direction.

On the other hand, in the image blur correction apparatus 20, when the second drive motor 32 is rotated, the second movement member 34 screwed on the motor shaft 32a is moved in the vertical direction. In conjunction with the movement of the second movement member 34, the coupling member 30 is moved in the vertical direction (refer to FIGS. 8 and 9). At this stage, the first tolerance portion 30a of the coupling member 30 slides in the vertical direction with respect to the first movement member 33 screwed on the motor shaft 31a of the first drive motor 31. When the coupling member 30 is moved in the vertical direction, the lens unit 21 coupled by the coupling portion 30c is turned in the second direction about the second axis, whereby a correction operation is carried out.

Figure 10:
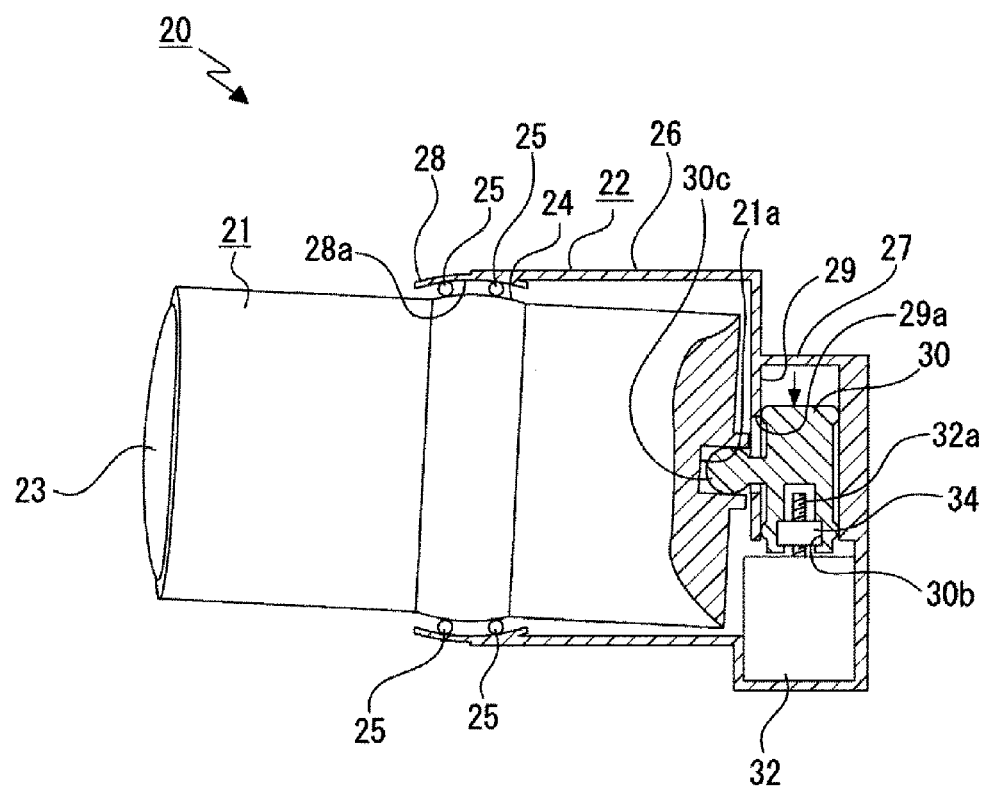
FIG. 10 is a partial cross-sectional side view illustrating a state in which a lens unit has been turned in a first direction and a second direction.
Figure 11:
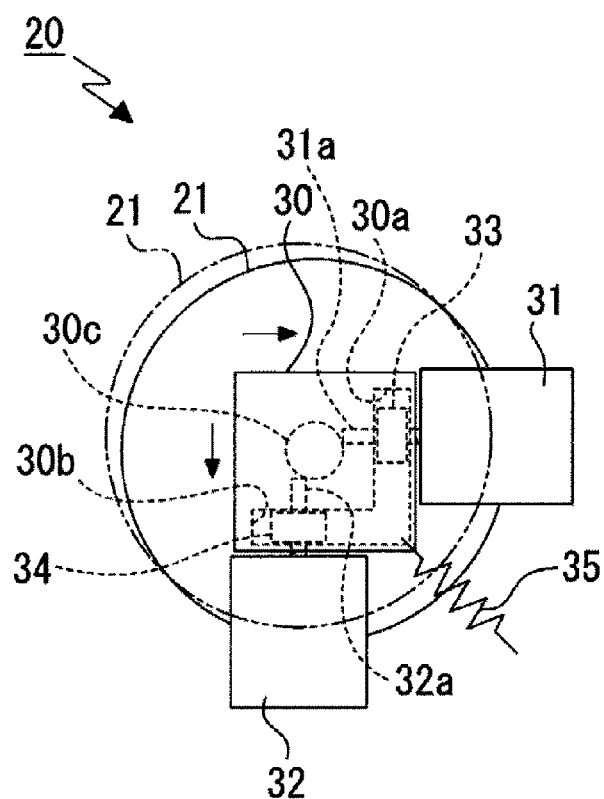
FIG. 11 is a schematic rear view illustrating a state in which a lens unit has been turned in a first direction and a second direction.

Further, in the image blur correction apparatus 20, when the first drive motor 31 and the second drive motor 32 are rotated, the first movement member 33 screwed on the motor shaft 31a is moved in the horizontal direction, and the second movement member 34 screwed on the motor shaft 32a is moved in the vertical direction. In conjunction with the movement of the first movement member 33, the coupling member 30 is moved in the horizontal direction, and in conjunction with the movement of the second movement member 34, the coupling member 30 is moved in the vertical direction (refer to FIGS. 10 and 11). At this stage, the second tolerance portion 30b of the coupling member 30 slides in the horizontal direction with respect to the second movement member 34 screwed on the motor shaft 32a of the second drive motor 32, and the first tolerance portion 30a of the coupling member 30 slides in the vertical direction with respect to the first movement member 33 screwed on the motor shaft 31a of the first drive motor 31. When the coupling member 30 is moved in the horizontal direction and moved in the vertical direction, the lens unit 21 coupled by the coupling portion 30c is turned in the first direction about the first axis and turned in the second direction about the second axis, whereby a correction operation is carried out.

In the above-described blur correction operation, since the coupling member 30 is biased by the biasing spring 35 in a direction between the axis direction of the first axis and the axis direction of the second axis, the coupling member 30 is moved without any rattling, and the lens unit 21 is turned with a high degree of precision. Especially, the occurrence of rattle caused by backlash between the motor shafts 31a and 32b and the first movement member 33 and second movement member 34 can be prevented.

As described above, in the image blur correction apparatus 20, since the coupling portion 30c of the coupling member 30 is coupled to the lens unit 21, the turning of the lens unit 21 is constant based on the movement amount of the coupling member 30 regardless of the turning direction, so that the control of the blur correction operation can be performed more easily.

Further, since the biasing spring 35 is provided that biases the coupling member 30 in a direction between the axis direction of the first axis and the axis direction of the second axis, the coupling member 30 is moved without any rattling, and the lens unit 21 is turned with a high degree of precision regardless of the turning direction, so that the positional accuracy of the lens unit in the turning direction 21 can be improved.

In addition, the first tolerance portion 30a of the coupling member 30 is slidably supported on the first movement member 33 in the axis direction of the first axis, and the second tolerance portion 30b is slidably supported on the second movement member 34 in the axis direction of the second axis.

Therefore, since the blur correction operation can be smoothly carried out with a simple configuration, the production costs of the image blur correction apparatus 20 can be reduced and the reliability of the blur correction operation can be improved.

Moreover, stepping motors are used for the first drive motor 31 and the second drive motor 32, and a nut member screwed on the motor shafts 31a and 31b is used as the first movement member 33 and the second movement member 34.

Therefore, since the blur correction operation can be smoothly carried out with a simple configuration, the production costs of the image blur correction apparatus 20 can be reduced and the reliability of the blur correction operation can be improved.

Figure 12:
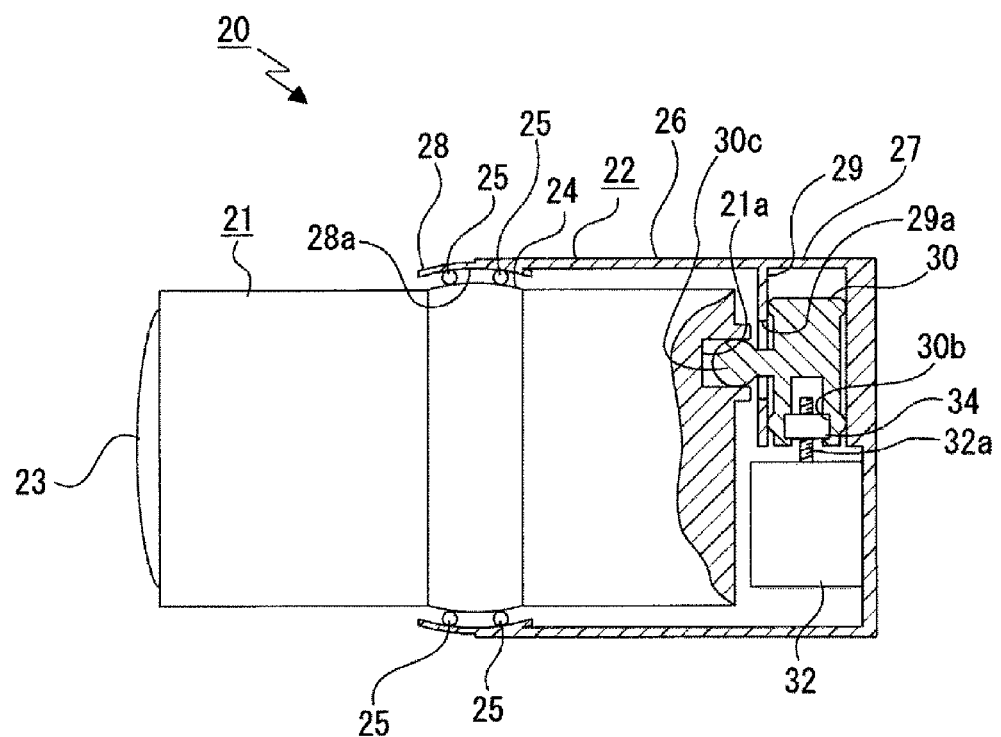
FIG. 12 is a partial cross-sectional side view that along with FIG. 13 illustrates an example of an image blur correction apparatus in which a coupling section between a lens unit and a coupling member is different.
Figure 13:
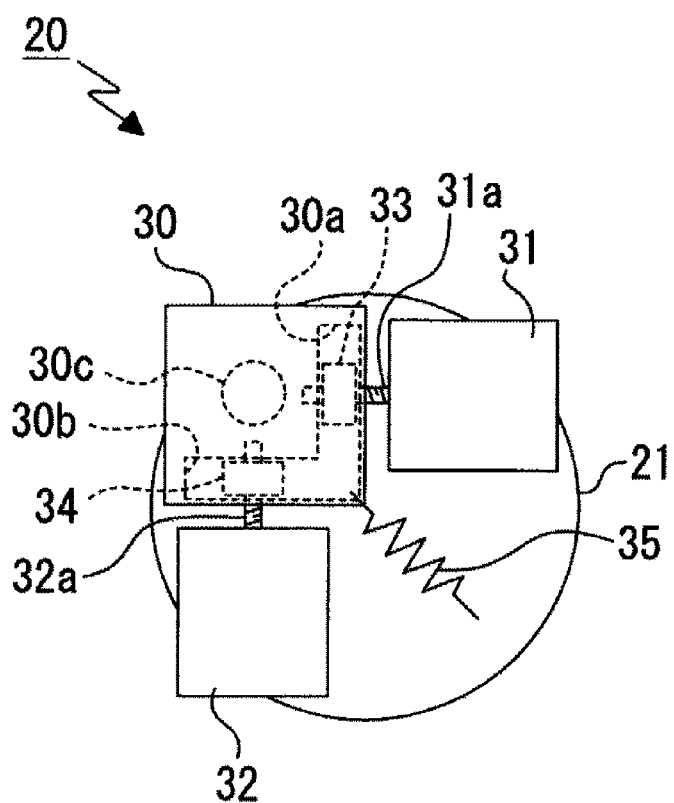
FIG. 13 is a schematic rear view.

It is noted that although an example was described above in which the coupling portion 30c of the coupling member 30 is coupled to the lens unit 21 on the light axis, for example, as illustrated in FIGS. 12 and 13, the coupling portion 30c may be coupled to the lens unit 21 at a position offset from the light axis. In this case, by arranging the coupling member 30, the first drive motor 31, and the second drive motor 32 so that overall these parts are roughly arranged at a position facing the rear face of the lens unit 21, the image blur correction apparatus 20 can be made more compact in the direction orthogonal to the light axis.

MODIFIED EXAMPLES OF THE IMAGE BLUR CORRECTION APPARATUS

Various modified examples of the image blur correction apparatus will now be described.

The various modified examples of the image blur correction apparatus illustrated below are only different from the above-described image blur correction apparatus 20 in that the position or orientation in which the drive motors are positioned is different, and that the coupling position of the coupling member to the lens unit is different. Therefore, regarding the various modified examples illustrated below, only the parts that are different to the image blur correction apparatus 20 will be described in detail. The other parts are denoted using the same reference numerals as the similar parts in the image blur correction apparatus 20, and a description thereof is omitted.

First Modified Example

Figure 14:
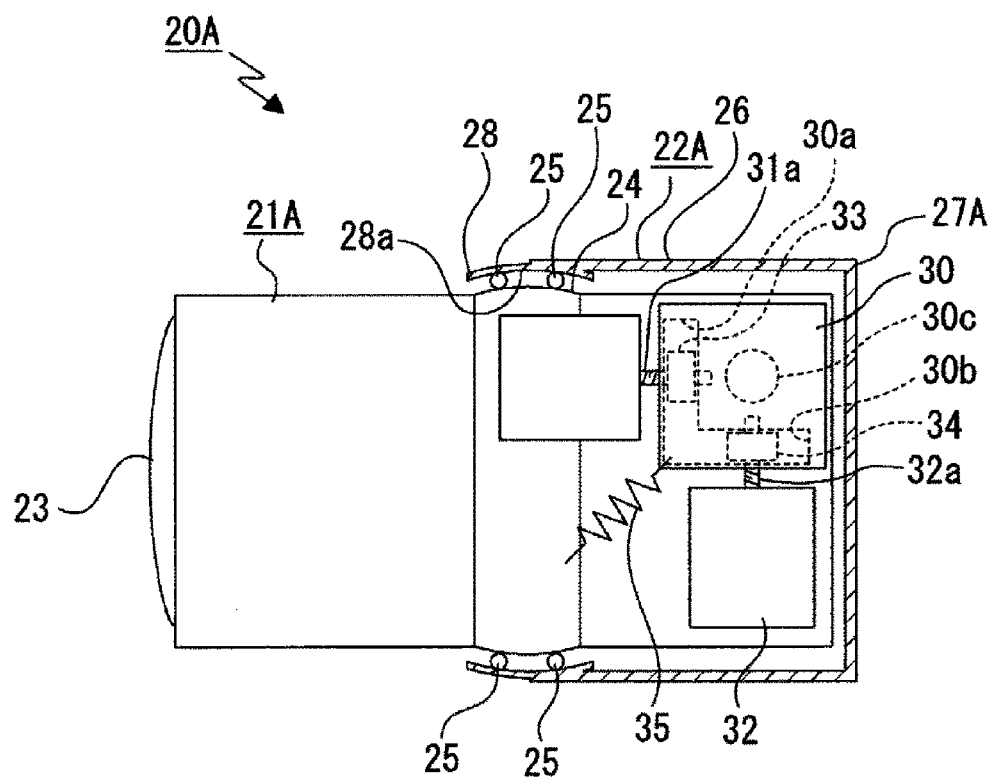
FIG. 14 is a partial cross-sectional side view that along with FIG. 15 illustrates an image blur correction apparatus according to a first modified example.
Figure 15:
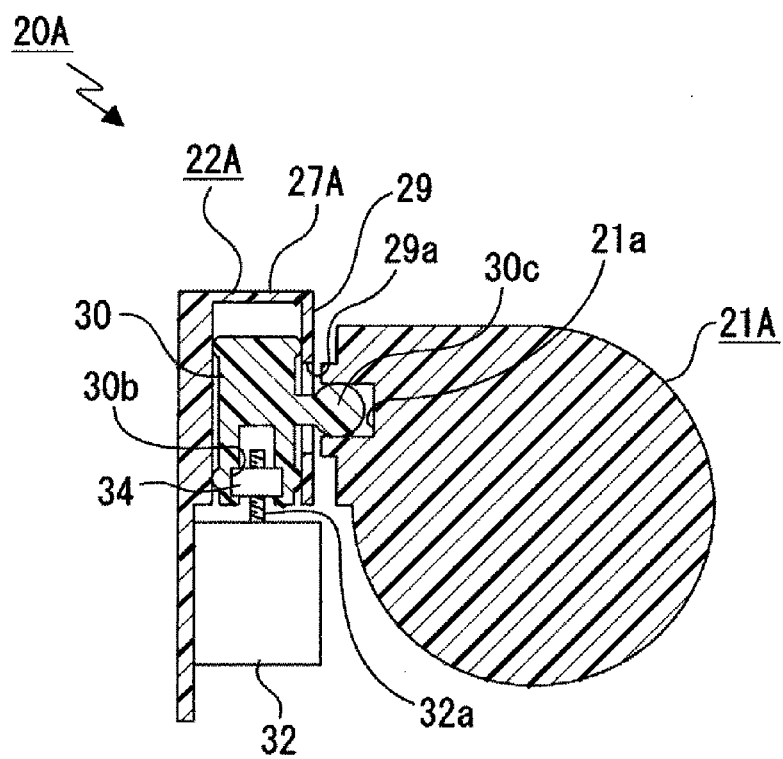
FIG. 15 is a schematic cross-sectional view.

First, an image blur correction apparatus 20A according to a first modified example will be described (refer to FIGS. 14 and 15).

The image blur correction apparatus 20A has a lens unit 21A and a fixed member 22A that supports the lens unit 21A.

A concave coupling portion 21a open to the side is formed on the lens unit 21A.

The fixed member 22A is provided with a holding portion 27A to the side of the lens unit 21A.

The lens unit 21A can be turned with respect to the fixed member 22A in the first direction (yaw direction) and in the second direction (pitch direction).

The coupling member 30 is movably supported in the front/rear direction and the vertical direction on the holding portion 27A of the fixed member 22A. The coupling portion 30c protruding toward the side is provided on the coupling member 30.

The coupling portion 30c of the coupling member 30 is inserted through the concave coupling portion 21a, thereby being coupled to the lens unit 21A.

The first drive motor 31 is arranged in front of the coupling member 30, and the motor shaft 31a extends in the front/rear direction. The second drive motor 32 is arranged below the coupling member 30, and the motor shaft 32a extends in a vertical direction.

In the image blur correction apparatus 20A, when the first drive motor 31 is rotated, the first movement member 33 is moved in the front/rear direction. In conjunction with the movement of the first movement member 33, the coupling member 30 is moved in the front/rear direction. At this stage, the second tolerance portion 30b of the coupling member 30 slides in the front/rear direction with respect to the second movement member 34. When the coupling member 30 is moved in the front/rear direction, the lens unit 21A is turned in the first direction about the first axis, whereby a correction operation is carried out.

On the other hand, in the image blur correction apparatus 20A, when the second drive motor 32 is rotated, the second movement member 34 is moved in the vertical direction. In conjunction with the movement of the second movement member 34, the coupling member 30 is moved in the vertical direction. At this stage, the first tolerance portion 30a of the coupling member 30 slides in the vertical direction with respect to the first movement member 33. When the coupling member 30 is moved in the vertical direction, the lens unit 21A is turned in the second direction about the second axis, whereby a correction operation is carried out.

Further, in the image blur correction apparatus 20A, when the first drive motor 31 and the second drive motor 32 are rotated, the first movement member 33 is moved in the front/rear direction, and the second movement member 34 is moved in the vertical direction. In conjunction with the movement of the first movement member 33, the coupling member 30 is moved in the front/rear direction, and in conjunction with the movement of the second movement member 34, the coupling member 30 is moved in the vertical direction. At this stage, the second tolerance portion 30b of the coupling member 30 slides in the front/rear direction with respect to the second movement member 34, and the first tolerance portion 30a of the coupling member 30 slides in the vertical direction with respect to the first movement member 33. When the coupling member 30 is moved in the front/rear direction and moved in the vertical direction, the lens unit 21A is turned in the first direction about the first axis and turned in the second direction about the second axis, whereby a correction operation is carried out.

Second Modified Example

Figure 16:
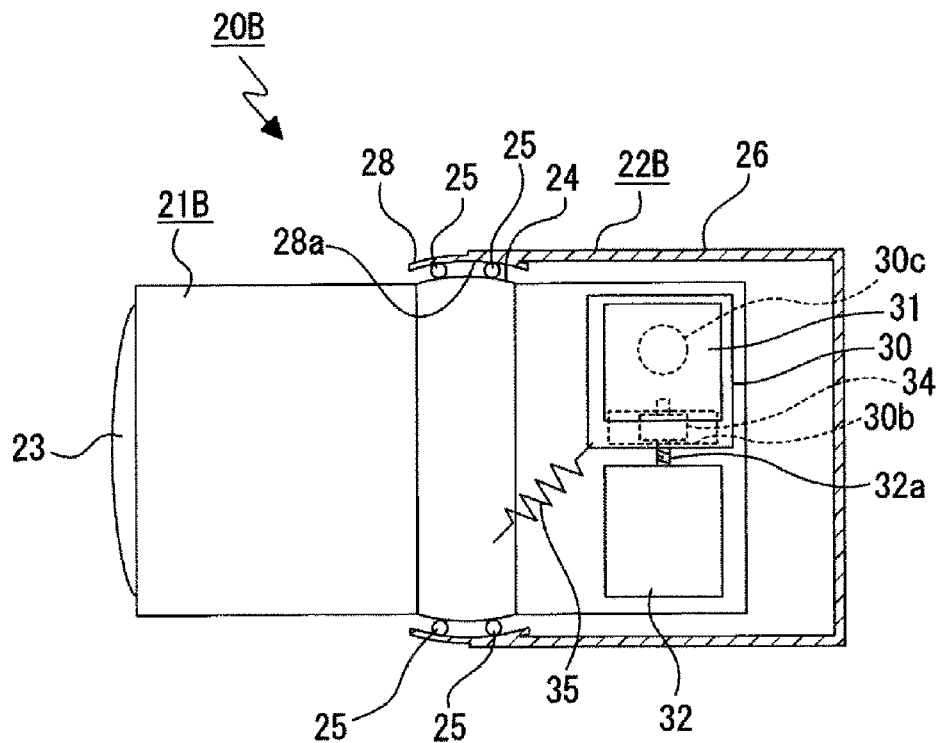
FIG. 16 is a partial cross-sectional side view that along with FIG. 17 illustrates an image blur correction apparatus according to a second modified example.
Figure 17:
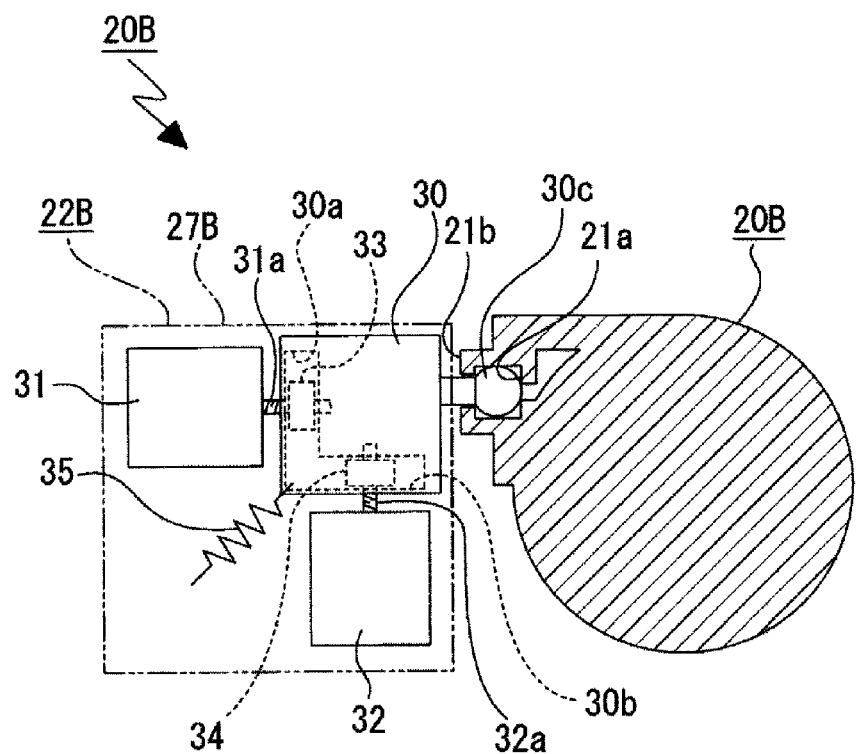
FIG. 17 is a partial cross-sectional schematic rear view.

Next, an image blur correction apparatus 20B according to a second modified example will be described (refer to FIGS. 16 and 17).

The image blur correction apparatus 20B has a lens unit 21B and a fixed member 22B that supports the lens unit 21B.

A concave coupling portion 21a open to the side is formed on the lens unit 21B.

The fixed member 22B is provided with a holding portion 27B to the side of the lens unit 21B.

The lens unit 21B can be turned with respect to the fixed member 22B in the first direction (yaw direction) and in the second direction (pitch direction).

The coupling member 30 is movably supported in the horizontal direction and the vertical direction on the holding portion 27B of the fixed member 22B. The coupling portion 30c protruding toward the side is provided on the coupling member 30.

The coupling portion 30c of the coupling member 30 is inserted through the concave coupling portion 21a, thereby being coupled to the lens unit 21B. It is noted that a jump-prevention portion 21b that prevents the coupling portion 30c from jumping from the concave coupling portion 21a is provided in the lens unit 21B.

The first drive motor 31 is arranged to the side of the coupling member 30, and the motor shaft 31a extends in the horizontal direction. The second drive motor 32 is arranged below the coupling member 30, and the motor shaft 32a extends in a vertical direction.

In the image blur correction apparatus 20B, when the first drive motor 31 is rotated, the first movement member 33 is moved in the horizontal direction. In conjunction with the movement of the first movement member 33, the coupling member 30 is moved in the horizontal direction. At this stage, the second tolerance portion 30b of the coupling member 30 slides in the horizontal direction with respect to the second movement member 34. When the coupling member 30 is moved in the horizontal direction, the lens unit 21B is turned in the first direction about the first axis, whereby a correction operation is carried out.

On the other hand, in the image blur correction apparatus 20B, when the second drive motor 32 is rotated, the second movement member 34 is moved in the vertical direction. In conjunction with the movement of the second movement member 34, the coupling member 30 is moved in the vertical direction. At this stage, the first tolerance portion 30a of the coupling member 30 slides in the vertical direction with respect to the first movement member 33. When the coupling member 30 is moved in the vertical direction, the lens unit 21B is turned in the second direction about the second axis, whereby a correction operation is carried out.

Further, in the image blur correction apparatus 20B, when the first drive motor 31 and the second drive motor 32 are rotated, the first movement member 33 is moved in the horizontal direction, and the second movement member 34 is moved in the vertical direction. In conjunction with the movement of the first movement member 33, the coupling member 30 is moved in the horizontal direction, and in conjunction with the movement of the second movement member 34, the coupling member 30 is moved in the vertical direction. At this stage, the second tolerance portion 30b of the coupling member 30 slides in the horizontal direction with respect to the second movement member 34, and the first tolerance portion 30a of the coupling member 30 slides in the vertical direction with respect to the first movement member 33. When the coupling member 30 is moved in the horizontal direction and moved in the vertical direction, the lens unit 21B is turned in the first direction about the first axis and turned in the second direction about the second axis, whereby a correction operation is carried out.

Third Modified Example

Next, an image blur correction apparatus 20C according to a first modified example will be described (refer to FIGS. 18 to 25).

Figure 18:
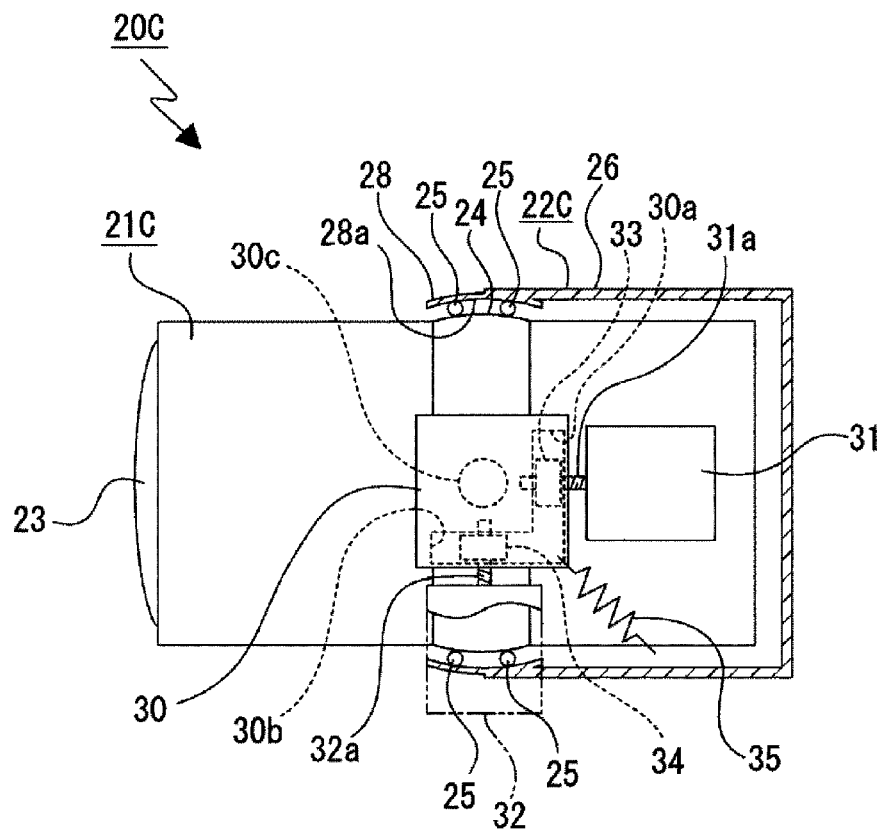
FIG. 18 is a partial cross-sectional side view that along with FIGS. 19 to 25 illustrates an image blur correction apparatus according to a third modified example.
Figure 19:
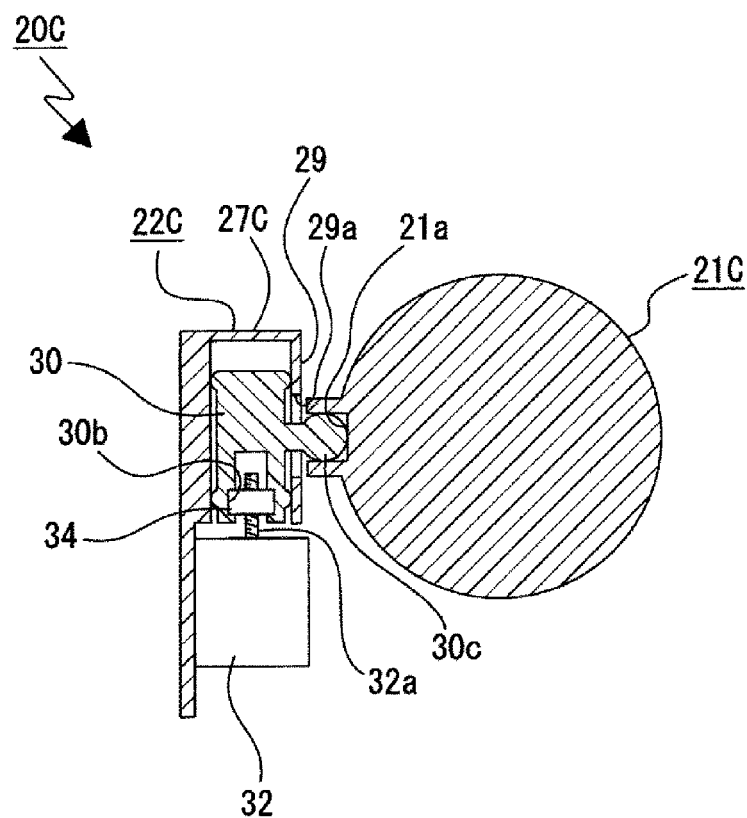
FIG. 19 is a schematic cross-sectional view.
Figure 20:
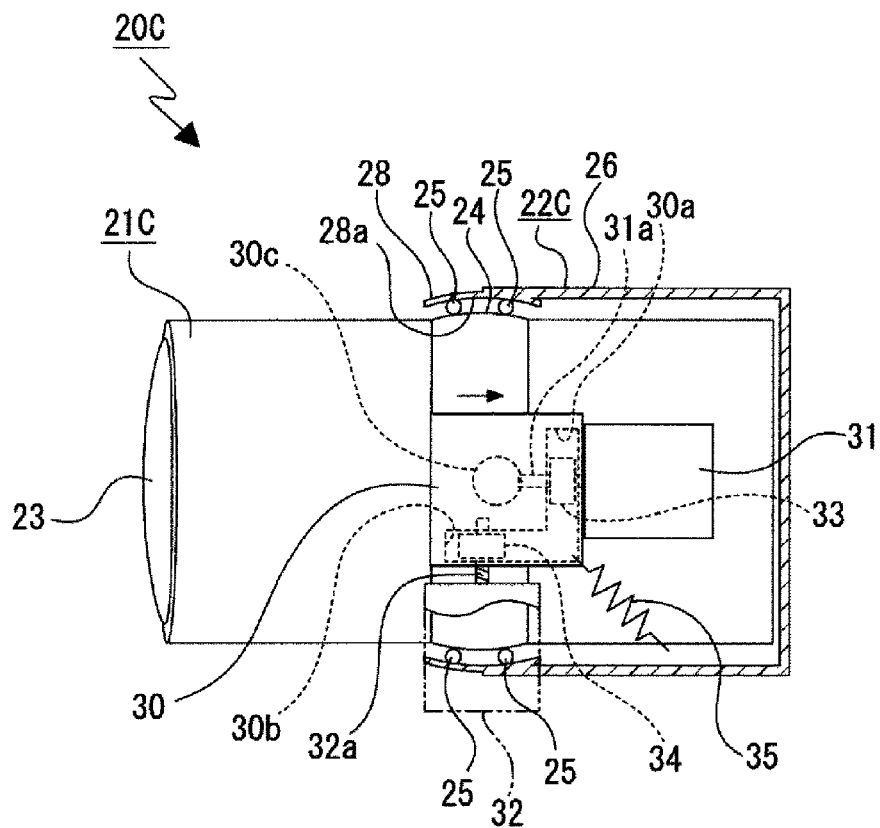
FIG. 20, which along with FIGS. 21 to 25 illustrates operation of an image blur correction apparatus, is a partial cross-sectional side view illustrating a state in which a lens unit has been turned in a first direction.
Figure 21:
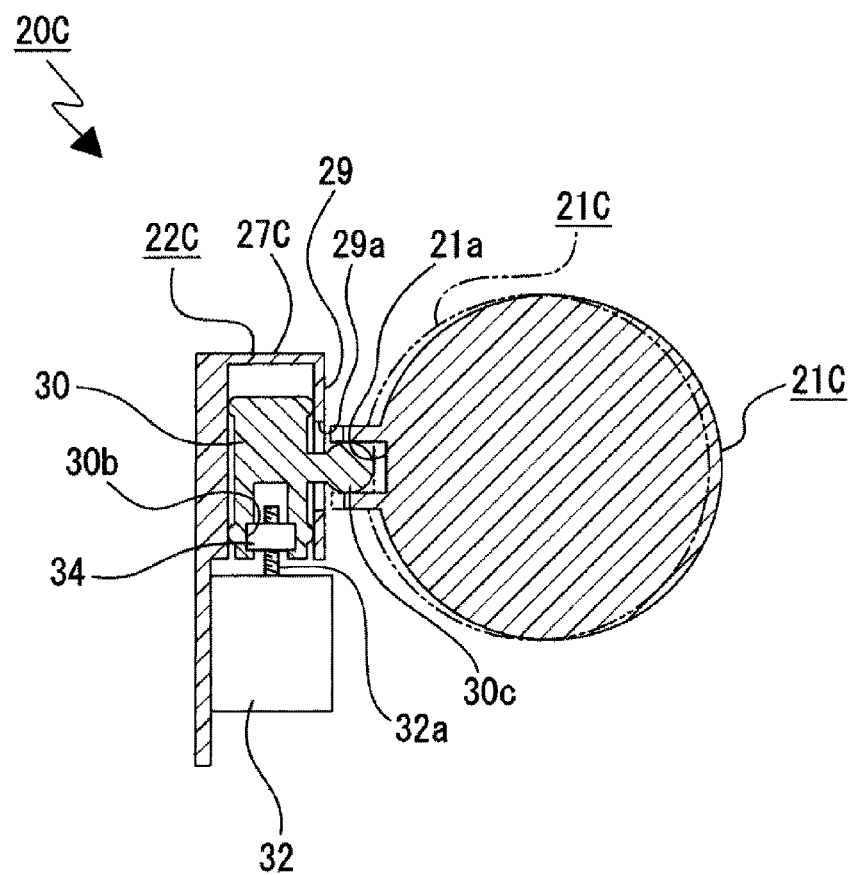
FIG. 21 is a schematic cross-sectional view illustrating a state in which a lens unit has been turned in a first direction.
Figure 22:
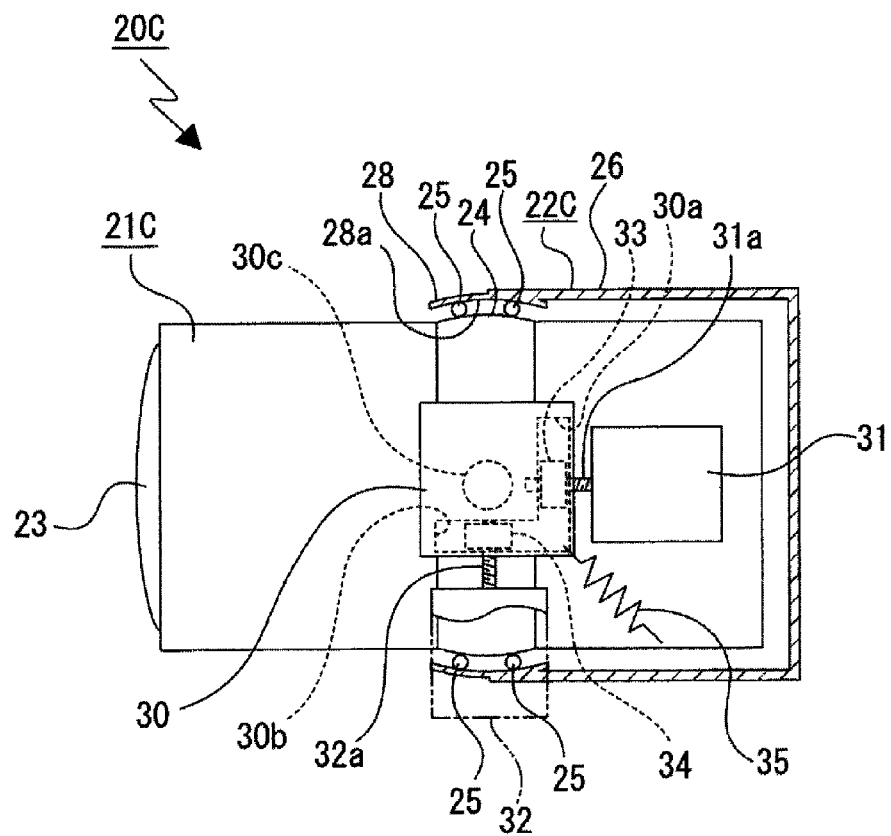
FIG. 22 is a partial cross-sectional side view illustrating a state in which a lens unit has been turned in a third direction.
Figure 23:
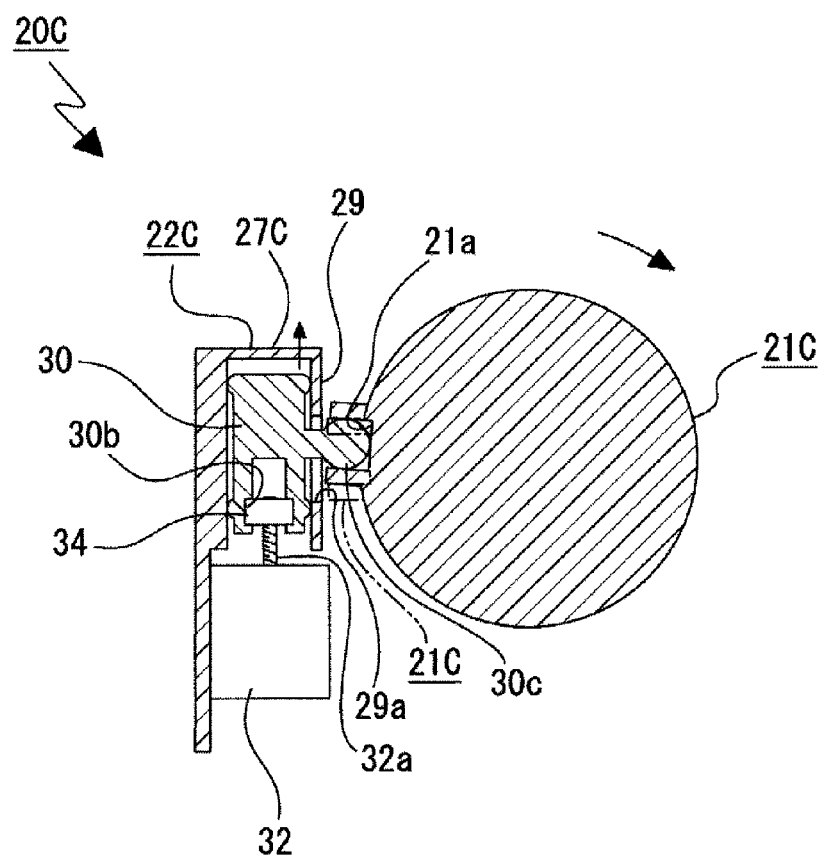
FIG. 23 is a schematic cross-sectional view illustrating a state in which a lens unit has been turned in a third direction.
Figure 24:
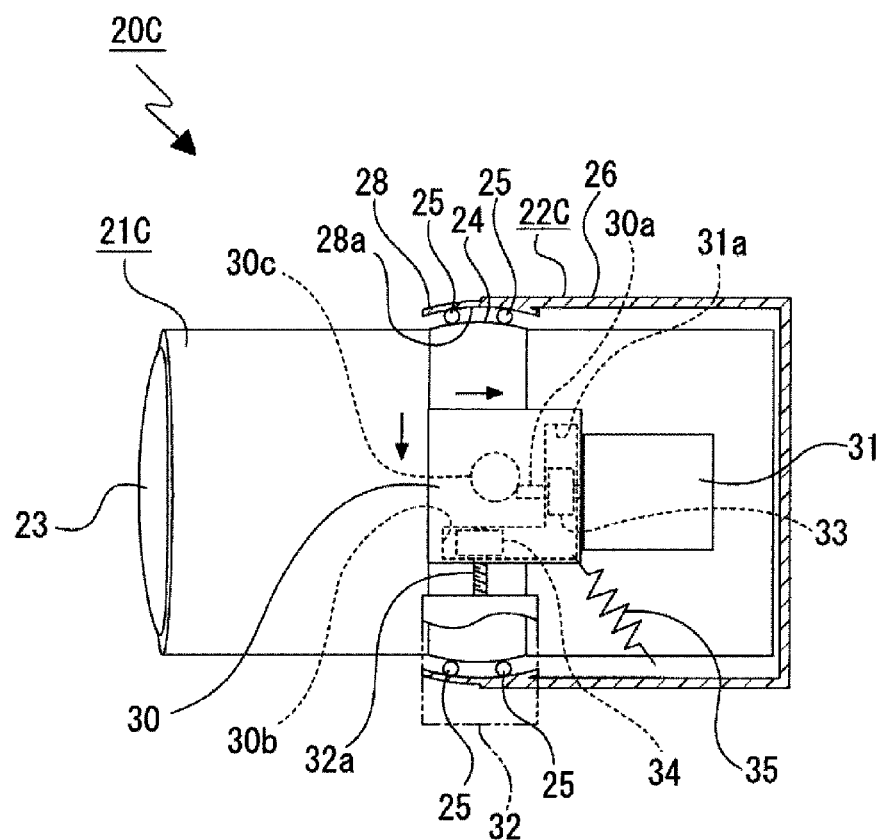
FIG. 24 is a partial cross-sectional side view illustrating a state in which a lens unit has been turned in a first direction and a third direction.
Figure 25:
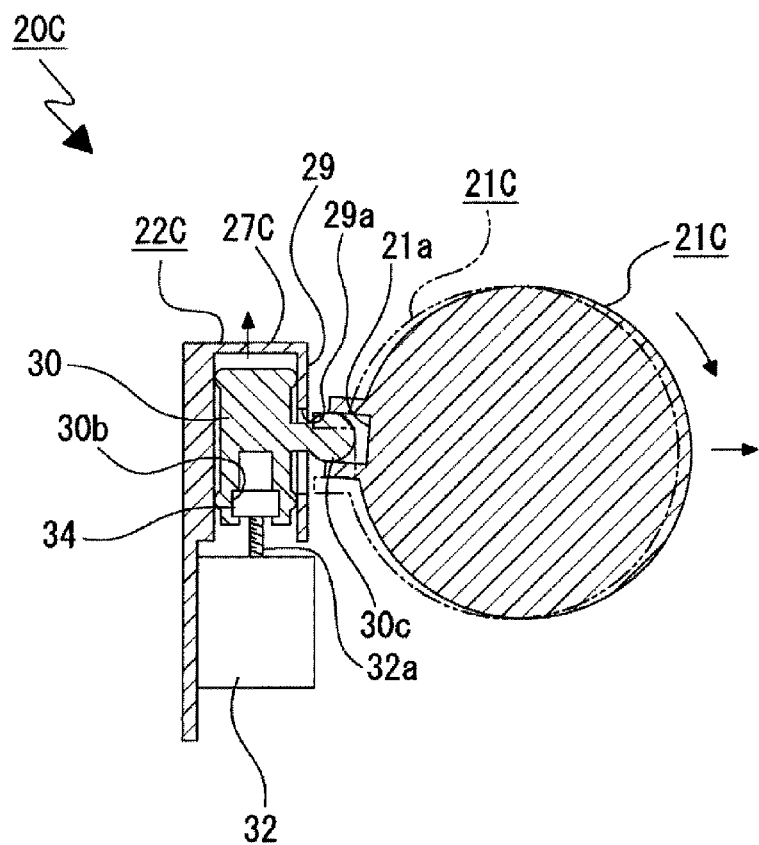
FIG. 25 is a schematic cross-sectional view illustrating a state in which a lens unit has been turned in a first direction and a third direction.

The image blur correction apparatus 20C has a lens unit 21C and a fixed member 22C that supports the lens unit 21C (refer to FIGS. 18 and 19).

A concave coupling portion 21a open to the side is formed on the lens unit 21C. The center of the concave coupling portion 21a is in line with the second axis.

The fixed member 22C is provided with a holding portion 27C to the side of the lens unit 21C.

The lens unit 21C can be turned with respect to the fixed member 22C in the first direction (yaw direction) and in a third direction (roll direction).

The coupling member 30 is movably supported in the front/rear direction and the vertical direction on the holding portion 27C of the fixed member 22C. The coupling portion 30c that protrudes toward the side is provided on the coupling member 30.

The coupling member 30 is movably supported in the front/rear direction and the vertical direction on the holding portion 27C of the fixed member 22C. The coupling portion 30c that protrudes toward the side is provided on the coupling member 30.

The first drive motor 31 is arranged to the rear of the coupling member 30, and the motor shaft 31a extends in the front/rear direction. The second drive motor 32 is arranged below the coupling member 30, and the motor shaft 32a extends in a vertical direction.

In a state before the blur correction operation is carried out, the image blur correction apparatus 20C is at a reference position where there has been no turning in the first direction or the second direction (refer to FIGS. 18 and 19).

In the image blur correction apparatus 20C, when the first drive motor 31 is rotated, the first movement member 33 is moved in the front/rear direction. In conjunction with the movement of the first movement member 33, the coupling member 30 is moved in the front/rear direction (refer to FIGS. 20 and 21). At this stage, the second tolerance portion 30b of the coupling member 30 slides in the front/rear direction with respect to the second movement member 34. When the coupling member 30 is moved in the front/rear direction, the lens unit 21C is turned in the first direction about the first axis, whereby a correction operation is carried out.

On the other hand, in the image blur correction apparatus 20C, when the second drive motor 32 is rotated, the second movement member 34 is moved in the vertical direction. In conjunction with the movement of the second movement member 34, the coupling member 30 is moved in the vertical direction (refer to FIGS. 22 and 23). At this stage, the first tolerance portion 30a of the coupling member 30 slides in the vertical direction with respect to the first movement member 33. When the coupling member 30 is moved in the vertical direction, since the coupling portion 30c of the coupling member 30 is coupled to the lens unit 21C on the second axis, the lens unit 21C is turned in the third direction about the light axis, whereby a correction operation is carried out.

Further, in the image blur correction apparatus 20C, when the first drive motor 31 and the second drive motor 32 are rotated, the first movement member 33 is moved in the front/rear direction, and the second movement member 34 is moved in the vertical direction. In conjunction with the movement of the first movement member 33, the coupling member 30 is moved in the front/rear direction, and in conjunction with the movement of the second movement member 34, the coupling member 30 is moved in the vertical direction (refer to FIGS. 24 and 25). At this stage, the second tolerance portion 30b of the coupling member 30 slides in the front/rear direction with respect to the second movement member 34, and the first tolerance portion 30a of the coupling member 30 slides in the vertical direction with respect to the first movement member 33. When the coupling member 30 is moved in the front/rear direction and moved in the vertical direction, the lens unit 21C is turned in the first direction about the first axis and turned in the third direction about the light axis, whereby a correction operation is carried out.

It is noted that although an example was described above in which the holding portion 27C of the fixed member 22C is provided to the side of the lens unit 21C, the holding portion 27C can also be provided above or below the lens unit 21C.

By providing the holding portion 27C above or below the lens unit 21C, so that the coupling portion 30c is coupled to the lens unit 21C on the first axis and the coupling member 30 is moved in the front/rear direction and the horizontal direction, the lens unit 21C can be turned with respect to the fixed member 22C in the second direction (pitch direction) and the third direction (roll direction).

Fourth Modified Example

Next, an image blur correction apparatus 20D according to a fourth modified example will be described (refer to FIGS. 26 to 34).

Figure 26:
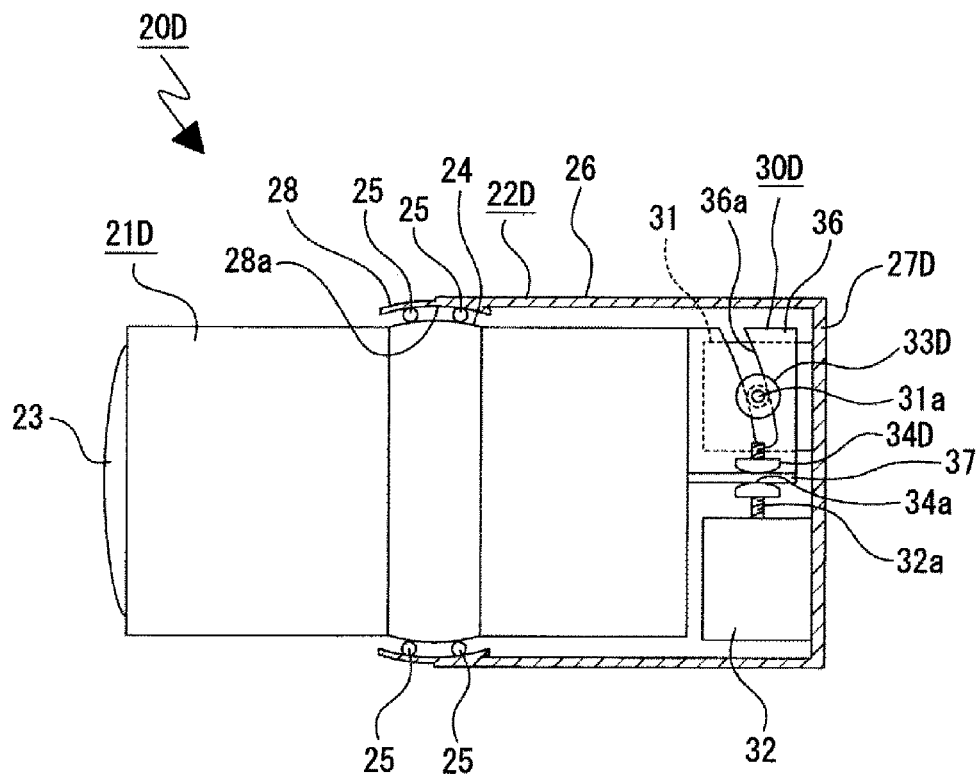
FIG. 26 is a partial cross-sectional side view that along with FIGS. 27 to 34 illustrates an image blur correction apparatus according to a fourth modified example.
Figure 27:
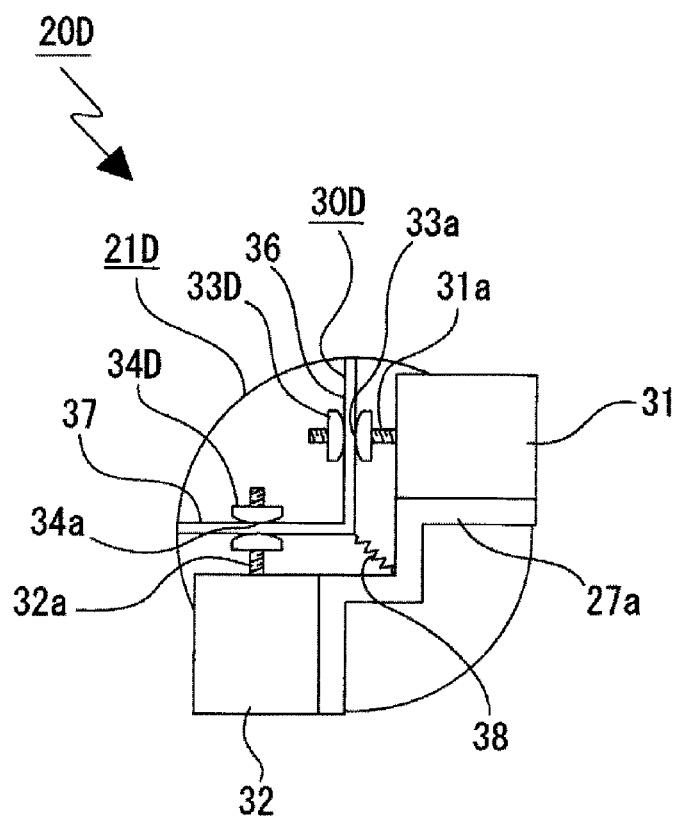
FIG. 27 is a schematic rear view.

The image blur correction apparatus 20D has a lens unit 21D and a fixed member 22D that supports the lens unit 21D (refer to FIGS. 26 and 27).

A coupling member 30D protruding toward the rear is attached to the rear face of the lens unit 21D. The coupling member 30D is formed from a first face portion 36 facing the horizontal direction and a second face portion 37 facing the vertical direction. The lower edge portion of the first face portion 36 and the right edge portion of the second face portion 37 are concatenated. The first face portion 36 is positioned directly behind the first axis, and the holding portion 27 is positioned directly behind the second axis.

It is noted that a concave coupling portion is not formed in the lens unit 21D.

Figure 28:
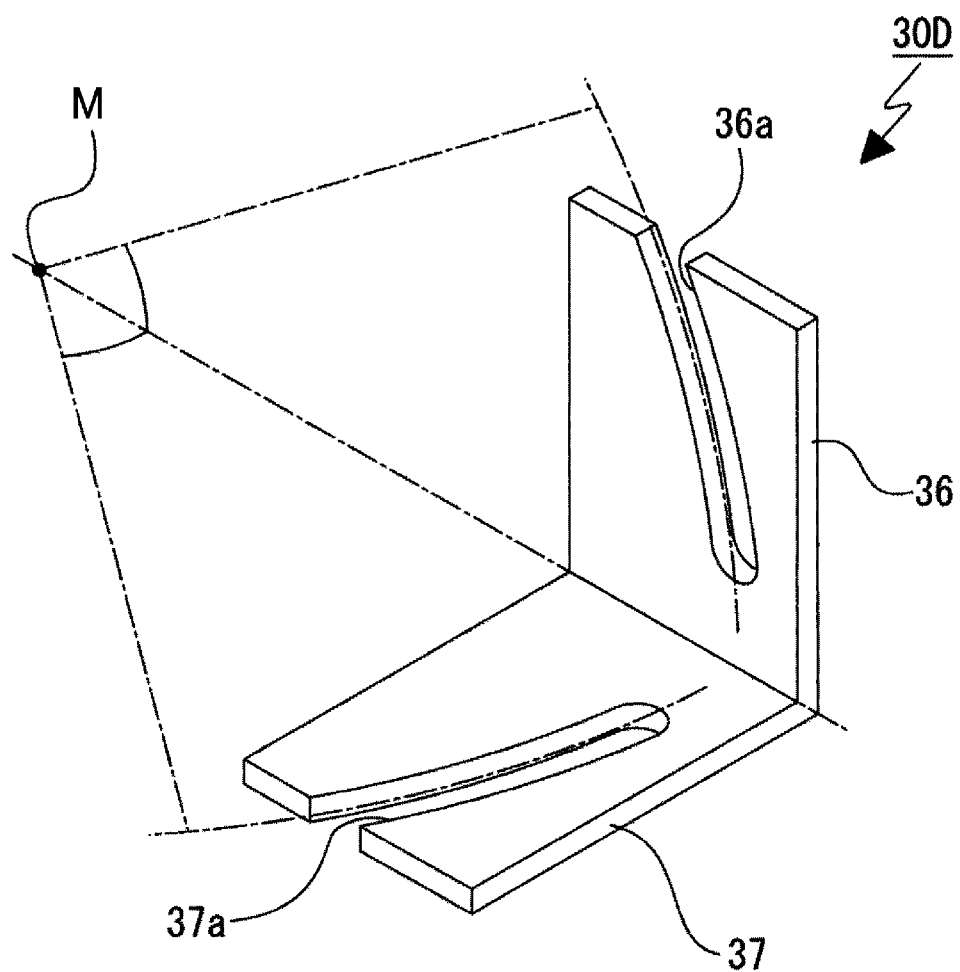
FIG. 28 is an exploded perspective view of a coupling member.
Figure 29:
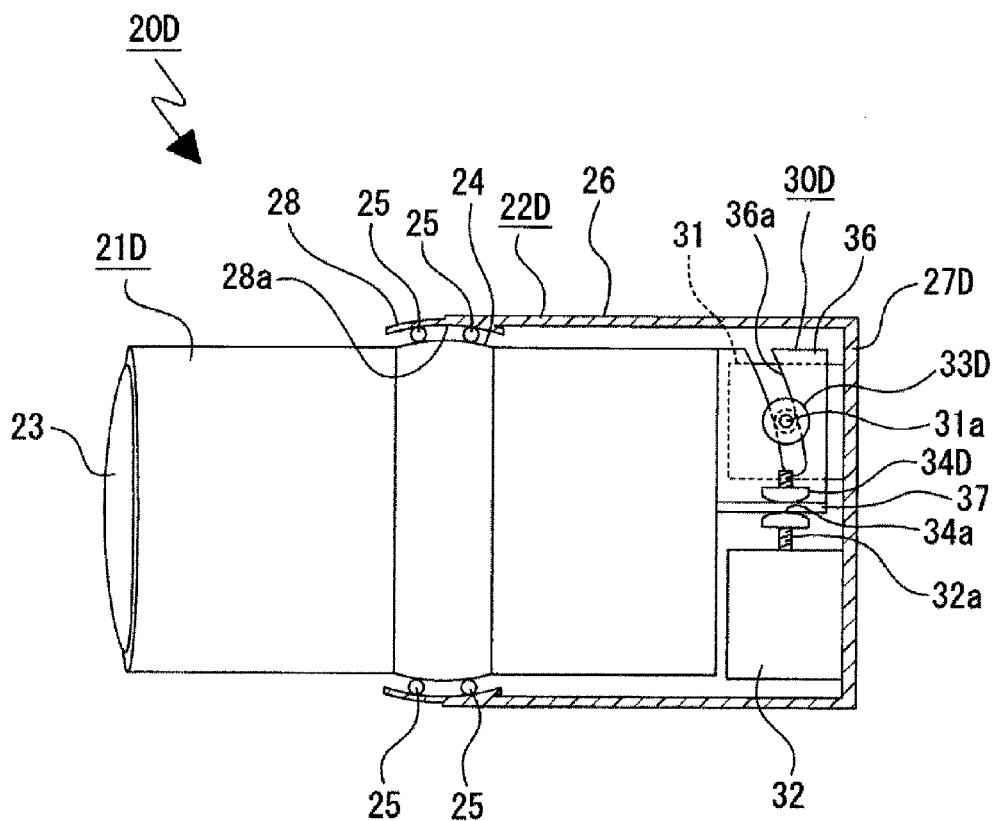
FIG. 29, which along with FIGS. 30 to 34 illustrates operation of an image blur correction apparatus, is a partial cross-sectional side view illustrating a state in which a lens unit has been turned in a first direction.
Figure 30:
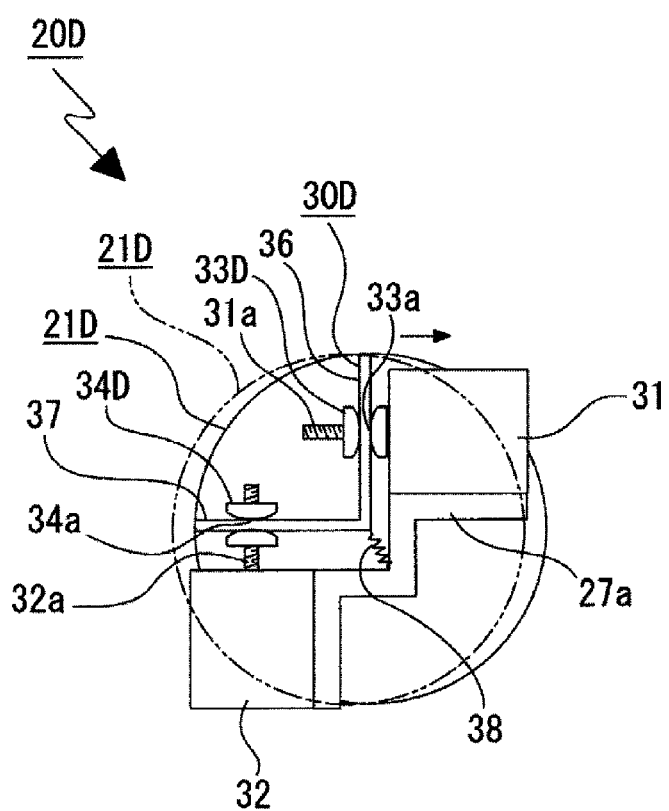
FIG. 30 is a schematic rear view illustrating a state in which a lens unit has been turned in a first direction.
Figure 31:
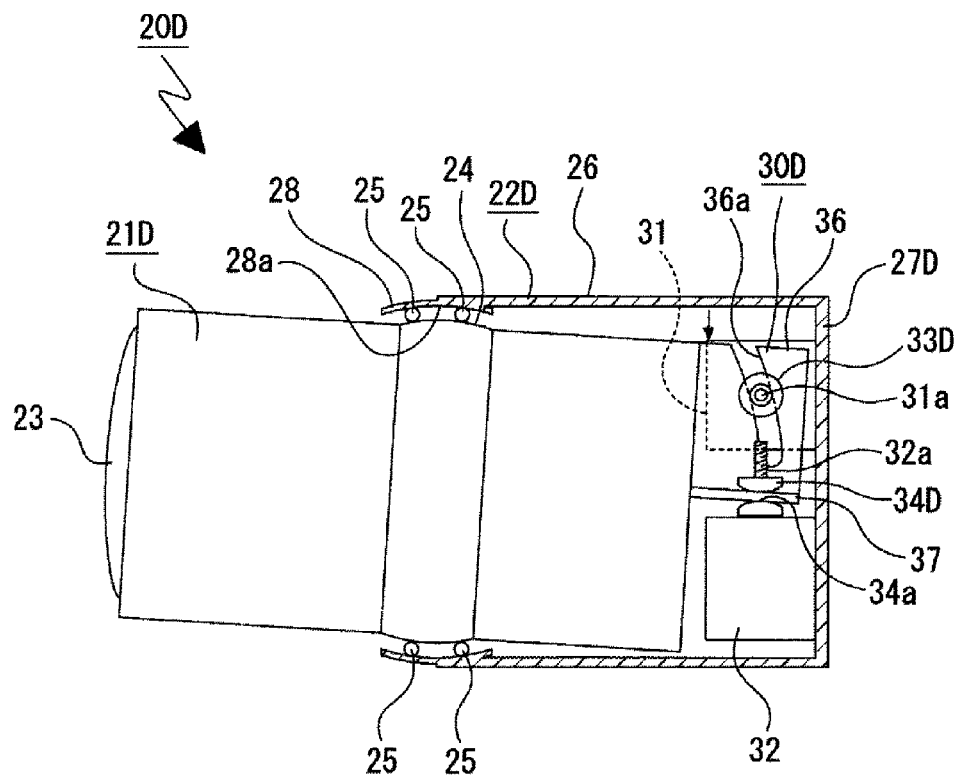
FIG. 31 is a partial cross-sectional side view illustrating a state in which a lens unit has been turned in a second direction.
Figure 32:
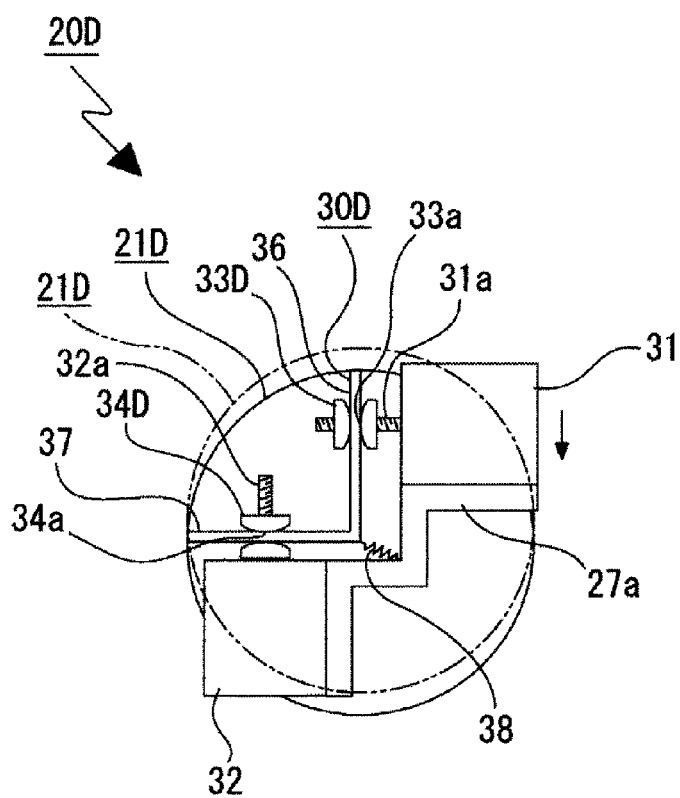
FIG. 32 is a schematic rear view illustrating a state in which a lens unit has been turned in a second direction.
Figure 33:
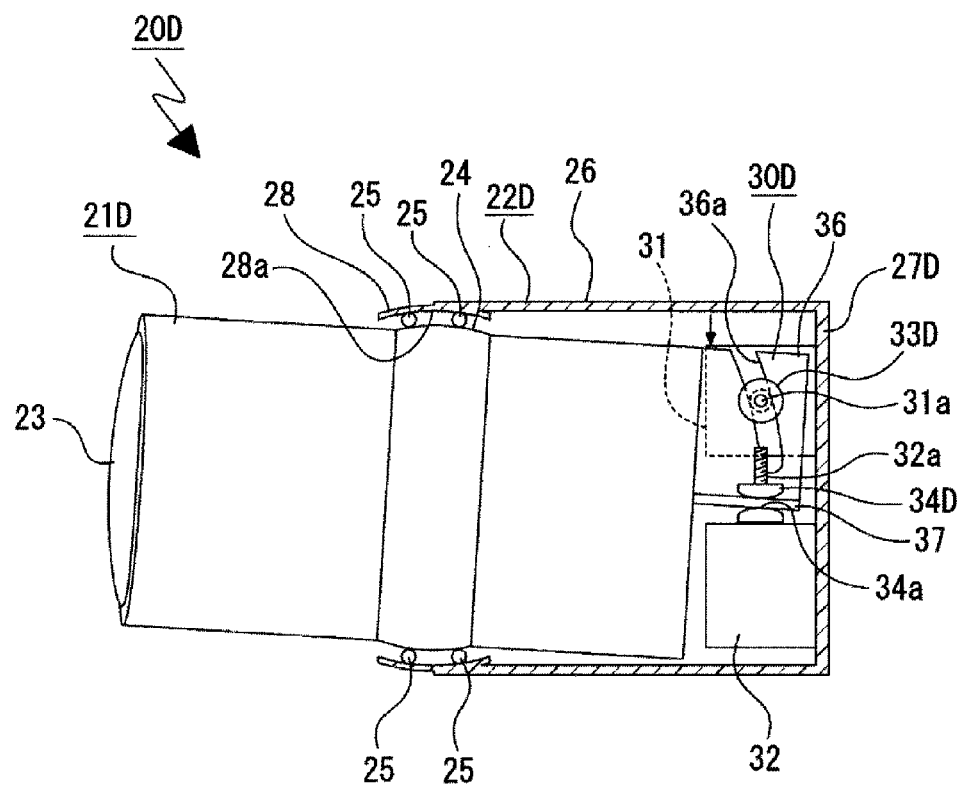
FIG. 33 is a partial cross-sectional side view illustrating a state in which a lens unit has been turned in a first direction and a second direction.
Figure 34:
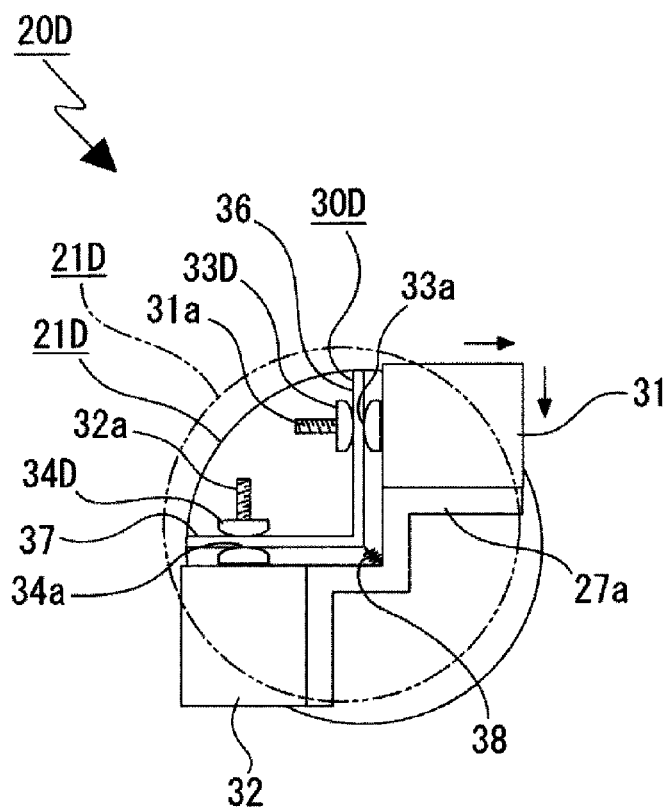
FIG. 34 is a schematic cross-sectional view illustrating a state in which a lens unit has been turned in a first direction and a second direction.

An arc-shaped first tolerance portion 36a is formed on the first face portion 36, and an arc-shaped second tolerance portion 37a is formed on the second face portion 37 (refer to FIG. 28). The first tolerance portion 36a and the second tolerance portion 37a are formed in an arc shape around an intersection M of the first axis and the second axis.

An attachment plate 27a is provided on the holding portion 27D of the fixed member 22D. The first drive motor 31 and the second drive motor 32 are attached to the attachment plate 27a. The motor shaft 31a extends in the horizontal direction, and the motor shaft 32a extends in the vertical direction. A first movement member 33D and a second movement member 34D are screwed on the motor shafts 31a and 32a of the first drive motor 31 and the second drive motor 32, respectively. A first engaging groove 33a and a second engaging groove 34a that extend in a circumferential direction are formed on the first movement member 33D and the second movement member 34D, respectively.

The first movement member 33D is configured so that the first engaging groove 33a is engaged with the first tolerance portion 36a of the first face portion 36, which allows the first tolerance portion 36a to slide along the first movement member 33D. The second movement member 34D is configured so that the second engaging groove 34a is engaged with the second tolerance portion 37a of the second face portion 37, which allows the second tolerance portion 37a to slide along the second movement member 34D.

A biasing spring 38 is supported between the coupling member 30D and the attachment plate 27a of the holding portion 27D. The lens unit 21D is biased by the biasing spring 38 via the coupling member 30D in a direction between the axis direction of the first axis and the axis direction of the second axis.

In a state before the blur correction operation is carried out, the image blur correction apparatus 20D is at a reference position where there has been no turning in the first direction or the second direction (refer to FIGS. 26 and 27).

In the image blur correction apparatus 20D, when the first drive motor 31 is rotated, the first movement member 33D is moved in the horizontal direction. In conjunction with the movement of the first movement member 33D, the coupling member 30D and the lens unit 21D are integrally moved in the horizontal direction (refer to FIGS. 29 and 30). At this stage, the second tolerance portion 37a of the coupling member 30D slides along the engaging groove 34a of the second movement member 34D. When the coupling member 30D and the lens unit 21D are integrally moved in the horizontal direction, the lens unit 21D is turned in the first direction about the first axis, whereby a correction operation is carried out.

On the other hand, in the image blur correction apparatus 20D, when the second drive motor 32 is rotated, the second movement member 34D is moved in the vertical direction. In conjunction with the movement of the second movement member 34D, the coupling member 30D and the lens unit 21D are integrally moved in the vertical direction (refer to FIGS. 31 and 32). At this stage, the first tolerance portion 36a of the coupling member 30D slides along the engaging groove 33a of the first movement member 33D. When the coupling member 30D and the lens unit 21D are integrally moved in the vertical direction, the lens unit 21D is turned in the second direction about the second axis, whereby a correction operation is carried out.

In the image blur correction apparatus 20D, when the first drive motor 31 and the second drive motor 32 are rotated, the first movement member 33D is moved in the horizontal direction, and the second movement member 34D is moved in the vertical direction. In conjunction with the movement of the first movement member 33D, the coupling member 30D and the lens unit 21D are integrally moved in the horizontal direction, and in conjunction with the movement of the second movement member 34D, the coupling member 30D and the lens unit 21D are integrally moved in the vertical direction (refer to FIGS. 33 and 34). At this stage, the second tolerance portion 37a of the coupling member 30D slides along the engaging groove 34a of the second movement member 34D, and the first tolerance portion 36a of the coupling member 30D slides along the engaging groove 33a of the first movement member 33D. When the coupling member 30D and the lens unit 21D are integrally moved in the horizontal direction and the vertical direction, the lens unit 21D is turned in the first direction about the first axis and in the second direction about the second axis, whereby a correction operation is carried out.

As described above, in the image blur correction apparatus 20D, the first tolerance portion 36a is slidably supported on the first movement member 33D, the second tolerance portion 37a is slidably supported on the second movement member 34D, and the first tolerance portion 36a and the second tolerance portion 37a are formed in an arc shape around an intersection M of the first axis and the second axis.

Therefore, the lens unit 21D smoothly slides in the first direction and the second direction around the intersection M, so that the blur correction operation can be carried out more smoothly.

Further, since the biasing spring 38 is provided that biases the coupling member 30D in a direction between the axis direction of the first axis and the axis direction of the second axis, the coupling member 30D is moved without any rattling, and the lens unit 21D is turned with a high degree of precision regardless of the turning direction, so that the positional accuracy of the lens unit in the turning direction 21D can be improved.

Other Examples

Although an example was described above in which lens units 21, 21A, 21B, 21C, and 21D are turnably supported on fixed members 22, 22A, 22B, 22C, and 22D via the spheres 25, 25, . . . , lens units 21, 21A, 21B, 21C, and 21D can also be turnably supported on fixed members 22, 22A, 22B, 22C, and 22D without providing the spheres 25, 25, . . . .

Further, the configuration for supporting the lens unit on the fixed member is not limited to the above-described configuration. Various configurations may be used, as long as the lens unit is turnably supported on the fixed member.

[Imaging Apparatus Embodiment]

Figure 35:
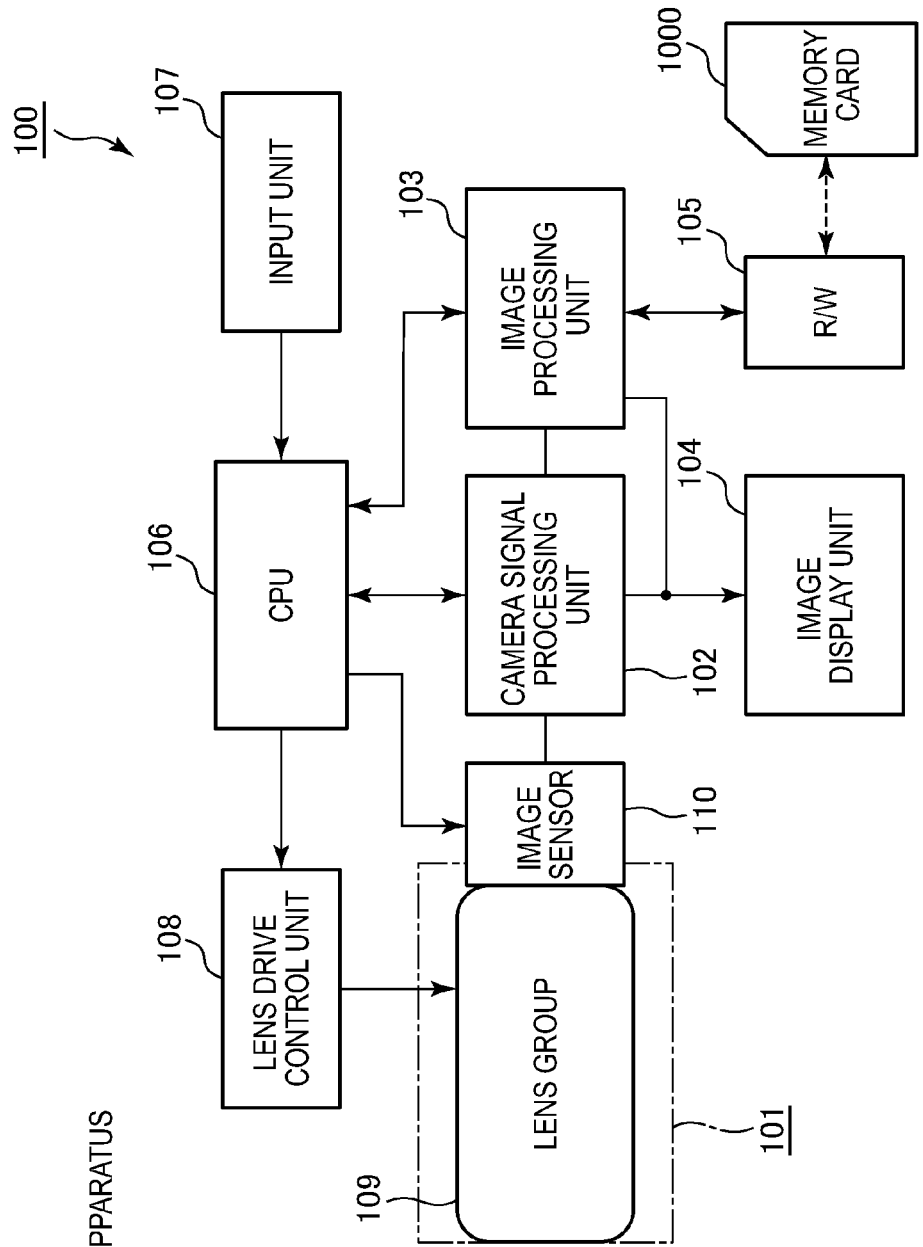
FIG. 35 is a block diagram of an imaging apparatus.

FIG. 35 illustrates a block diagram of a video camera according to an embodiment of the imaging apparatus of the present technology.

An imaging apparatus (video camera) 100 (corresponding to the imaging apparatus 1) has a lens unit 101 (corresponding to lens units 21, 21A, 21B, 21C, and 21D) that is responsible for an imaging function, a camera signal processing unit 102 that performs signal processing such as analog-digital conversion of a captured image signal, and an image processing unit 103 that performs recording and playback processing of the image signal. Further, the imaging apparatus 100 includes an image display unit 104 such as a liquid crystal panel, which displays captured images and the like, a R/W (reader/writer) 105 that reads/writes image signals from/to a memory card 1000, a CPU (central processing unit) 106 that controls the whole imaging apparatus 100, an input unit 107 (corresponding to operating switch 7, operating button 8, and operating button 10) configured from various switches and the like, on which operations are performed by the user, and a lens drive control unit 108 that controls the drive of the lenses arranged in the lens unit 101.

The lens unit 101 is configured from, for example, an optical system that includes a lens group 109 (corresponding to the lens group provided in the lens units 21, 21A, 21B, 21C, and 21D), and an image sensor 110 such as a CCD (charge-coupled device) or a CMOS (complementary metal-oxide semiconductor) and the like.

The camera signal processing unit 102 performs various types of signal processing, such as conversion of an output signal from the image sensor 110 into a digital signal, noise reduction, image correction, and conversion into luminance/color difference signal.

The image processing unit 103 performs, for example, compression and encoding/decompression and decoding of image signals based on a predetermined image data format, and conversion processing of the data specification, such as the resolution.

The image display unit 104 has a function for displaying various data, such as an operation state and captured images, on the input unit 107 of the user.

The R/W 105 performs writing of the image data encoded by the image processing unit 103 onto the memory card 1000 and reading of the image data recorded on the memory card 1000.

The CPU 106 functions as a control processing unit that controls the respective circuit blocks provided in the imaging apparatus 100, and controls the respective circuit blocks based on instruction input signals and the like from the input unit 107.

The input unit 107 is configured from, for example, a shutter release lever for performing a shutter operation, and a selection switch for selecting an operation mode. The input unit 107 outputs instruction input signals to the CPU 106 based on the operation made by the user.

The lens drive control unit 108 controls (not illustrated) motors and the like that drive the respective lenses of the lens group 109 based on control signals from the CPU 106.

The memory card 1000 is, for example, a semiconductor memory that can be inserted into and removed from a slot connected to the R/W 105.

The operations performed by the imaging apparatus 100 will now be described.

In an imaging standby state, under the control of the CPU 106, an image signal captured by the lens unit 101 is output to the image display unit 104 via the camera signal processing unit 102, and is displayed as a camera still image. Further, when an instruction input signal for zooming is input from the input unit 107, the CPU 106 outputs a control signal to the lens drive control unit 108, and a predetermined lens in the lens group 109 is moved based on a control from the lens drive control unit 108.

When a (not illustrated) shutter in the lens unit 101 is operated by an instruction input signal from the input unit 107, the captured image signal is output from the camera signal processing unit 102 to the image processing unit 103, subjected to compression and encoding processing, and is converted into digital data having a predetermined data format. The converted data is output to the R/W 105, and is written in the memory card 1000.

Focusing and zooming are performed by the lens drive control unit 108 moving a predetermined lens in the lens group 109 based on a control signal from the CPU 106.

When playing back image data recorded in the memory card 1000, based on an operation on the input unit 107, predetermined image data is read from the memory card 1000 by the R/W 105, and decompression and decoding processing is performed by the image processing unit 103. Then, the playback image signal is output to the image display unit 104, and the playback image is displayed.

[Conclusion]

As described above, for the imaging apparatus 1, first tolerance portions 30a and 36a and second tolerance portions 30b and 36b are formed in coupling members 30 and 30D, which allows lens units 21, 21A, 21B, 21C, and 21D to turn in two different directions.

By configuring the imaging apparatus 1 in this manner, there is an increased degree of freedom in the arrangement of coupling members 30 and 30D, and the first drive motor 31 and the second drive motor 32. Further, lens units 21, 21A, 21B, 21C, and 21D can be smoothly turned with respect to fixed members 22, 22A, 22B, 22C, and 22D by first tolerance portions 30a and 36a and second tolerance portions 30b and 36b.

Therefore, the blur correction operation can be carried out more smoothly while ensuring a degree of design freedom.

[Present Technology]

Additionally, the present technology may also be configured as below.

(1) An image blur correction apparatus including:
    a lens unit configured to include at least one lens and configured to be turnable in two different directions using, as supporting points, two axes that are orthogonal to an outer housing;

a fixed member configured to turnably support the lens unit in the two directions;
a first drive motor configured to be mounted on the fixed member and configured to turn the lens unit in one of the two directions;
a second drive motor configured to be mounted on the fixed member and configured to turn the lens unit in another of the two directions; and
a coupling member configured to be coupled to the first drive motor and the second drive motor and configured to include a coupling portion, the coupling portion being coupled to the lens unit to transmit drive force of the first drive motor and the second drive motor to the lens unit in a manner that the coupling member is moved along with turning of the lens unit,
wherein the coupling member has, formed thereon,
a first tolerance portion configured to maintain a coupled state of the first drive motor while the second drive motor is driven to allow the lens unit to turn in the other direction, and
a second tolerance portion configured to maintain a coupled state of the second drive motor while the first drive motor is driven to allow the lens unit to turn in the one direction.
(2) The image blur correction apparatus according to (1), wherein the coupling portion of the coupling member is coupled to the lens unit on a first axis or a second axis.
(3) The image blur correction apparatus according to (1) or (2), further including:
a biasing spring configured to bias the coupling member in a direction between an axis direction of a first axis and an axis direction of a second axis.
(4) The image blur correction apparatus according to any one of (1) to (3), further including:
a first movement member configured to be moved by the first drive motor in an axis direction of a second axis; and
a second movement member configured to be moved by the second drive motor in an axis direction of a first axis,
wherein the coupling member is moved in the axis direction of the second axis by movement of the first movement member, and is moved in the axis direction of the first axis by movement of the second movement member,
wherein the first tolerance portion is slidably supported by the first movement member in the axis direction of the first axis, and
wherein the second tolerance portion is slidably supported by the second movement member in the axis direction of the second axis.
(5) The image blur correction apparatus according to (4), wherein stepping motors are used for the first drive motor and the second drive motor, and
wherein nut members screwed on motor shafts are used for the first movement member and the second movement member.
(6) The image blur correction apparatus according to any one of (1) to (5),
wherein the first tolerance portion is slidably supported by a first movement member,
wherein the second tolerance portion is slidably supported on the second movement member, and
wherein the first tolerance portion and the second tolerance portion are formed in an arc shape around an intersection of the two axes.

(7) An imaging apparatus including:
an image blur correction apparatus configured to include a lens unit that includes at least one lens and an outer housing that has the lens unit arranged therein,
wherein the lens unit is configured to be turnable in two different directions using, as supporting points, two axes that are orthogonal to the outer housing to correct image blur, and
wherein the image blur correction apparatus includes
a fixed member configured to turnably support the lens unit in the two directions,
a first drive motor configured to be mounted on the fixed member and configured to turn the lens unit in one of the two directions,
a second drive motor configured to be mounted on the fixed member and configured to turn the lens unit in another of the two directions, and
a coupling member configured to be coupled to the first drive motor and the second drive motor and configured to include a coupling portion, the coupling portion being coupled to the lens unit to transmit drive force of the first drive motor and the second drive motor to the lens unit in a manner that the coupling member is moved along with turning of the lens unit,
wherein the coupling member has, formed thereon,
a first tolerance portion configured to maintain a coupled state of the first drive motor while the second drive motor is driven to allow the lens unit to turn in the other direction, and
a second tolerance portion configured to maintain a coupled state of the second drive motor while the first drive motor is driven to allow the lens unit to turn in the one direction.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-122335 filed in the Japan Patent Office on May 29, 2012, the entire content of which is hereby incorporated by reference.

What is claimed is:
1. An image blur correction apparatus comprising:
a lens unit configured to include at least one lens, and configured to be turnable in a first direction which is a direction about a first supporting axis that is orthogonal to a light axis of the lens with respect to an outer housing, and in a second direction which is a direction about a second supporting axis that is orthogonal to the light axis and the first supporting axis;
a fixed member configured to turnably support the lens unit in the first direction and the second direction;
a first drive motor configured to be mounted on the fixed member and configured to turn the lens unit in the first direction;
a second drive motor configured to be mounted on the fixed member and configured to turn the lens unit in the second direction; and
a coupling member configured to be coupled to the first drive motor by a first movement member and the second drive motor by a second movement member and configured to include a coupling portion, the coupling portion being coupled to the lens unit to transmit drive force of the first drive motor and the second drive motor to the lens unit in a manner that the coupling member is moved along with turning of the lens unit,
wherein the coupling member has, formed thereon,
a first tolerance portion configured to maintain a coupled state of the first drive motor while the second drive motor is driven to allow the lens unit to turn in the second direction through movement of the first movement member, and
a second tolerance portion configured to maintain a coupled state of the second drive motor while the first drive motor is driven to allow the lens unit to turn in the first direction through movement of the second movement member.

2. The image blur correction apparatus according to claim 1, wherein the coupling portion of the coupling member is coupled to the lens unit on the first supporting axis or the second supporting axis.

3. The image blur correction apparatus according to claim 1, further comprising:
a biasing spring configured to bias the coupling member in a direction between an axis direction of the first supporting axis and an axis direction of the second supporting axis.

4. The image blur correction apparatus according to claim 1, wherein the first movement member is configured to be moved by the first drive motor in an axis direction of the second supporting axis; and the second movement member is configured to be moved by the second drive motor in an axis direction of the first supporting axis, wherein the coupling member is moved in the axis direction of the second supporting axis by movement of the first movement member, and is moved in the axis direction of the first supporting axis by movement of the second movement member, the first tolerance portion is slidably supported by the first movement member in the axis direction of the first supporting axis, and the second tolerance portion is slidably supported by the second movement member in the axis direction of the second supporting axis.

5. The image blur correction apparatus according to claim 4, wherein stepping motors are used for the first drive motor and the second drive motor, and nut members screwed on motor shafts are used for the first movement member and the second movement member.

6. The image blur correction apparatus according to claim 1, wherein the first tolerance portion is slidably supported by the first movement member, the second tolerance portion is slidably supported on the second movement member, and the first tolerance portion and the second tolerance portion are formed in an arc shape around an intersection of the first supporting axis and the second supporting axis.

7. An imaging apparatus comprising:
an image blur correction apparatus configured to include a lens unit that includes at least one lens and an outer housing that has the lens unit arranged therein, wherein the lens unit is configured to be turnable in a first direction which is a direction about a first supporting axis that is orthogonal to a light axis of the lens with respect to an outer housing, and in a second direction which is a direction about a second supporting axis that is orthogonal to the light axis and the first supporting axis to correct image blur, and
wherein the image blur correction apparatus includes:
a fixed member configured to turnably support the lens unit in the first direction and the second direction, and
a coupling member configured to be coupled to the first drive motor by a first movement member and the second drive motor by a second movement member and configured to include a coupling portion, the coupling portion being coupled to the lens unit to transmit drive force of the first drive motor and the second drive motor to the lens unit in a manner that the coupling member is moved along with turning of the lens unit, wherein the coupling member has, formed thereon:
first tolerance portion configured to maintain a coupled state of the first drive motor while the second drive motor is driven to allow the lens unit to turn in the second direction through movement of the first movement member, and
a second tolerance portion configured to maintain a coupled state of the second drive motor while the first drive motor is driven to allow the lens unit to turn in the first direction through movement of the second movement member.

8. The imaging apparatus according to claim 7, wherein the coupling portion of the coupling member is coupled to the lens unit on the first supporting axis or the second supporting axis.

9. The imaging apparatus according to claim 7, further comprising:
a biasing spring configured to bias the coupling member in a direction between an axis direction of the first supporting axis and an axis direction of the second supporting axis.

10. The imaging apparatus according to claim 7, wherein the first movement member is configured to be moved by the first drive motor in an axis direction of the second supporting axis; and
the second movement member is configured to be moved by the second drive motor in an axis direction of the first supporting axis, wherein the coupling member is moved in the axis direction of the second supporting axis by movement of the first movement member, and is moved in the axis direction of the first supporting axis by movement of the second movement member, the first tolerance portion is slidably supported by the first movement member in the axis direction of the first supporting axis, and the second tolerance portion is slidably supported by the second movement member in the axis direction of the second supporting axis.

11. The imaging apparatus according to claim 10, wherein stepping motors are used for the first drive motor and the second drive motor, and
nut members screwed on motor shafts are used for the first movement member and the second movement member.

12. The imaging apparatus according to claim 7, wherein the first tolerance portion is slidably supported by the first movement member, the second tolerance portion is slidably supported on the second movement member, and the first tolerance portion and the second tolerance portion are formed in an arc shape around an intersection of the first supporting axis and the second supporting axis.

* * * * *